United States Patent
Kim et al.

(10) Patent No.: US 11,864,217 B2
(45) Date of Patent: Jan. 2, 2024

(54) METHOD AND APPARATUS FOR MEASURING REMOTE CROSS-LINK INTERFERENCE

(71) Applicant: LG ELECTRONICS INC., Seoul (KR)

(72) Inventors: Dongkyu Kim, Seoul (KR); Inkwon Seo, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 486 days.

(21) Appl. No.: 17/267,784

(22) PCT Filed: Aug. 9, 2019

(86) PCT No.: PCT/KR2019/010047
§ 371 (c)(1),
(2) Date: Feb. 10, 2021

(87) PCT Pub. No.: WO2020/032666
PCT Pub. Date: Feb. 13, 2020

(65) Prior Publication Data
US 2021/0321417 A1    Oct. 14, 2021

Related U.S. Application Data

(60) Provisional application No. 62/755,257, filed on Nov. 2, 2018, provisional application No. 62/717,724, filed on Aug. 10, 2018.

(51) Int. Cl.
*H04W 4/00*    (2018.01)
*H04W 72/541*    (2023.01)
*H04L 5/00*    (2006.01)

(52) U.S. Cl.
CPC ......... *H04W 72/541* (2023.01); *H04L 5/0048* (2013.01)

(58) Field of Classification Search
CPC ... H04W 72/541; H04W 28/04; H04W 72/04; H04W 72/042; H04W 88/08;
(Continued)

(56) References Cited

U.S. PATENT DOCUMENTS

| 11,418,988 B2 * | 8/2022 | Jin | H04L 5/0048 |
| 11,664,917 B1 * | 5/2023 | Zhang | H04W 72/20 |
| | | | 455/63.1 |

(Continued)

FOREIGN PATENT DOCUMENTS

| KR | 1020110065410 | 6/2011 |
| WO | 2013177774 | 12/2013 |

(Continued)

OTHER PUBLICATIONS

PCT International Application No. PCT/KR2019/010047, International Search Report dated Nov. 29, 2019, 19 pages.

*Primary Examiner* — Phuongchau Ba Nguyen
(74) *Attorney, Agent, or Firm* — LEE, HONG, DEGERMAN, KANG & WAIMEY PC

(57) ABSTRACT

A method by which a first base station removes remote cross-link interference (CLI) can comprise: detecting the occurrence of a remote CLI; broadcasting a first reference signal including information on the first base station, on the basis of the detection of the occurrence of the remote CLI; obtaining information on a second base station; and determining that the remote CLI occurs, based on the information on the second base station. The first base station broadcasts the first reference signal, and the second base station, having received the first reference signal, can determine whether the (Continued)

occurrence of the remote CLI of the first base station is caused, based on the first reference signal.

13 Claims, 37 Drawing Sheets

(58) Field of Classification Search
CPC ... H04W 28/08; H04W 28/084; H04W 36/22; H04W 72/12; H04L 5/0048; H04L 27/26132; H04L 5/0007; H04J 11/0056
See application file for complete search history.

(56) References Cited

U.S. PATENT DOCUMENTS

| | | | |
|---|---|---|---|
| 2016/0044486 A1 | 2/2016 | Pais et al. | |
| 2017/0078055 A1 | 3/2017 | Malladi et al. | |
| 2018/0343608 A1* | 11/2018 | Duan | H04W 48/20 |
| 2020/0044764 A1* | 2/2020 | Xu | H04L 5/0048 |
| 2020/0112420 A1* | 4/2020 | Xu | H04L 5/0073 |
| 2020/0313779 A1* | 10/2020 | Kim | H04B 17/24 |
| 2021/0050983 A1* | 2/2021 | Manolakos | H04L 5/0073 |

FOREIGN PATENT DOCUMENTS

| | | | | |
|---|---|---|---|---|
| WO | WO-2014110783 A1 * | 7/2014 | | H04W 72/0426 |
| WO | 2018142506 | 8/2018 | | |

* cited by examiner

CSI-RS with density of 3 RE/PRB within an OFDM symbol

PRACH type A1 or B1 within two OFDM symbols

METHOD AND APPARATUS FOR MEASURING REMOTE CROSS-LINK INTERFERENCE

CROSS-REFERENCE TO RELATED APPLICATIONS

This application is the National Stage filing under 35 U.S.C. 371 of International Application No. PCT/KR2019/010047, filed on Aug. 9, 2019, which claims the benefit of U.S. Provisional Application No. 62/717,724, filed on Aug. 10, 2018, and 62/755,257, filed on Nov. 2, 2018, the contents of which are all incorporated by reference herein in their entirety.

TECHNICAL FIELD

The present disclosure relates to wireless communication and, more particularly, to a method of measuring remote cross-link interference and a user equipment (UE) therefor.

BACKGROUND ART

Compared to conventional half duplex communication in which time or frequency resources are divided orthogonally, full-duplex communication doubles a system capacity in theory by allowing a node to perform transmission and reception simultaneously.

FIG. 1 is a conceptual diagram of a UE and a base station (BS) which support full-duplex radio (FDR).

In the FDR situation illustrated in FIG. 1, the following three types of interference are produced.

Intra-Device Self-Interference:

Because transmission and reception take place using the same time and frequency resources, a desired signal and a signal transmitted from a BS or UE are received at the same time at the BS or UE. The transmitted signal is received with almost no attenuation at a Reception (Rx) antenna of the BS or UE, and thus with much larger power than the desired signal. As a result, the transmitted signal serves as interference.

UE to UE Inter-Link Interference:

An Uplink (UL) signal transmitted by a UE is received at an adjacent UE and thus serves as interference.

BS to BS Inter-Link Interference:

The BS to BS inter-link interference refers to interference caused by signals that are transmitted between BSs or heterogeneous BSs (pico, femto, and relay) in a HetNet state and received by an Rx antenna of another BS.

When full-duplex communication is used, cross-link interference (CLI) may occur between BSs. Due to environmental factors, CLI may occur between BSs that are distant from each other. The environmental factors may include an atmospheric duct effect. The atmospheric duct is a horizontal layer in the lower atmosphere in which vertical refractive index gradients are formed such that radio signals are guided and ducted to follow the curvature of the earth. The radio signals are subject less attenuation than the case in which the atmospheric duct is not present, so that the radio signals may further be transmitted. A procedure of measuring and managing remote CLI is needed.

DETAILED DESCRIPTION OF THE DISCLOSURE

Technical Problems

An object of the present disclosure is to provide a method of measuring remote CLI.

Another object of the present disclosure is to provide an apparatus for measuring remote CLI.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

According to the present disclosure, a method of cancelling remote cross-link interference (CLI) between base stations (BSs) by a first BS may include detecting occurrence of the remote CLI; broadcasting a first reference signal (RS) including information related to the first BS, based on detection of occurrence of the remote CLI; obtaining information related to a second BS from the second BS; and confirming that the remote CLI has been generated by the second BS, based on the information related to the second BS.

The method according to the present disclosure may further include receiving a second RS from the second BS, and the information related to the second BS may be acquired based on the second RS.

A location of a time-frequency resource of the first RS and a location of a time-frequency resource of the second RS may be preset, and the second BS may detect occurrence of the remote CLI at the first BS, based on the location of the time-frequency resource of the first RS.

According to the present disclosure, a method of canceling remote cross-link interference (CLI) between base stations (BSs) by a second BS may include receiving a first reference signal (RS) including information related to a first BS; confirming that the remote CLI has occurred at the first BS by downlink transmission of the second BS, based on the first RS; and transmitting information related to the second BS to the first BS.

The method according to the present disclosure may further include calculating a distance between the first BS and the second BS based on the information related to the first BS; obtaining a location of a time-frequency resource of a downlink signal of the second BS at which the remote CLI affects an uplink signal of the first BS, based on the distance between the first BS and the second BS; receiving information about a technique for canceling the remote CLI from the first BS; and skipping transmission of the downlink signal of the second BS or reducing power of the downlink signal, at the obtained location of the time-frequency resource based on the technique for canceling the remote CLI.

According to the present disclosure, a first base station (BS) for cancelling remote cross-link interference (CLI) between BSs may include a transceiver connected to at least one processor; and the at least one processor.

The at least one processor may be configured to detect occurrence of the remote CLI, broadcast a first reference signal (RS) including information related to the first BS, based on detection of occurrence of the remote CLI, obtain information related to a second BS from the second BS, and confirm that the remote CLI has been generated by the second BS, based on the information related to the second BS.

According to the present disclosure, a second base station (BS) for cancelling remote cross-link interference (CLI) between BSs may include a transceiver connected to at least one processor; and the at least one processor.

The at least one processor may be configured to receive a first reference signal (RS) including information related to a first BS, confirm that the remote CLI has occurred at the first BS by downlink transmission of the second BS, based on the first RS, and transmit information related to the second BS to the first BS.

The first BS and the second BS may be installed in a self-driving device communicating with at least one of a mobile terminal, a base station, or a self-driving vehicle.

Advantageous Effects

According to a proposal of the present disclosure, remote CLI between BSs may be cancelled by measuring the remote CLI.

The effects that can be achieved through the embodiments of the present disclosure are not limited to what has been particularly described hereinabove and other effects which are not described herein can be derived by those skilled in the art from the following detailed description.

DESCRIPTION OF DRAWINGS

The accompanying drawings, which are included to provide a further understanding of the invention and are incorporated in and constitute a part of this specification, illustrate embodiments of the invention.

BEST MODE FOR CARRYING OUT THE DISCLOSURE

Figure 1:
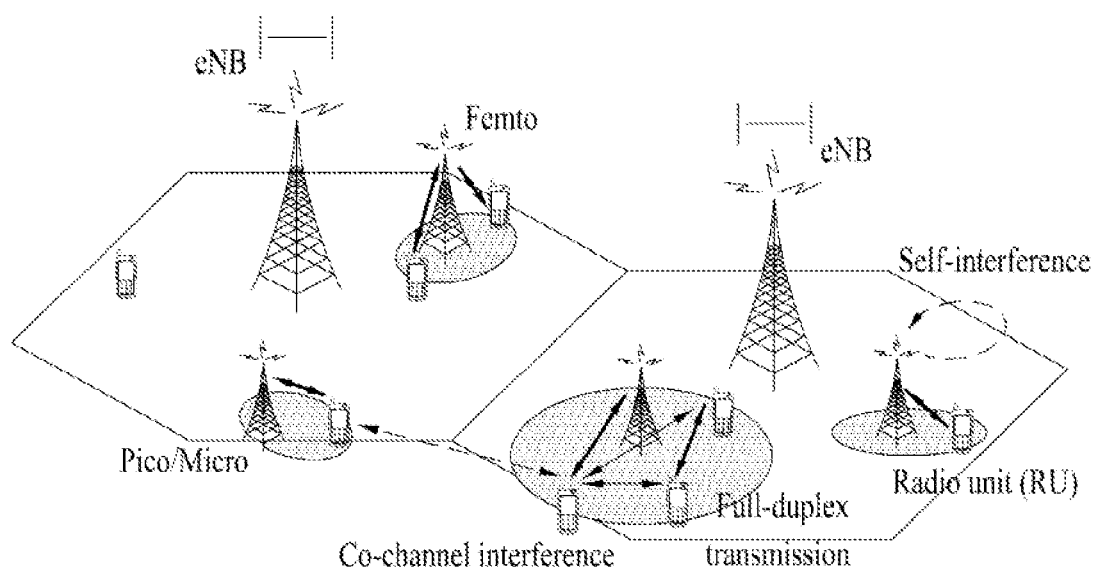
FIG. 1 is a diagram exemplarily illustrating a network supporting a full/half duplex communication operation mode of a UE according to the present invention.

Reference will now be made in detail to the preferred embodiments of the present disclosure, examples of which are illustrated in the accompanying drawings. In the following detailed description of the disclosure includes details to help the full understanding of the present disclosure. Yet, it is apparent to those skilled in the art that the present disclosure can be implemented without these details. For instance, although the following descriptions are made in detail on the assumption that a mobile communication system includes 3GPP LTE system and 3GPP LTE-A, the following descriptions are applicable to other random mobile communication systems in a manner of excluding unique features of the 3GPP LTE and 3GPP LTE-A.

Occasionally, to prevent the present disclosure from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The embodiments of the present disclosure can be applied to various wireless access systems such as code division multiple access (CDMA), frequency division multiple access (FDMA), time division multiple access (TDMA), orthogonal frequency division multiple access (OFDMA), single carrier frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as IEEE 802.11 (Wi-Fi), IEEE 802.16 (WiMAX), IEEE 802.20, evolved UTRA (E-UTRA), etc. UTRA is a part of universal mobile telecommunications system (UMTS). 3GPP LTE is a part of evolved UMTS (E-UMTS) using E-UTRA, adopting OFDMA for DL and SC-FDMA for UL. LTE-advanced (LTE-A) is an evolution of 3GPP LTE.

Moreover, in the following description, specific terminologies are provided to help the understanding of the present disclosure. And, the use of the specific terminology can be modified into another form within the scope of the technical idea of the present disclosure.

Figure 2A:
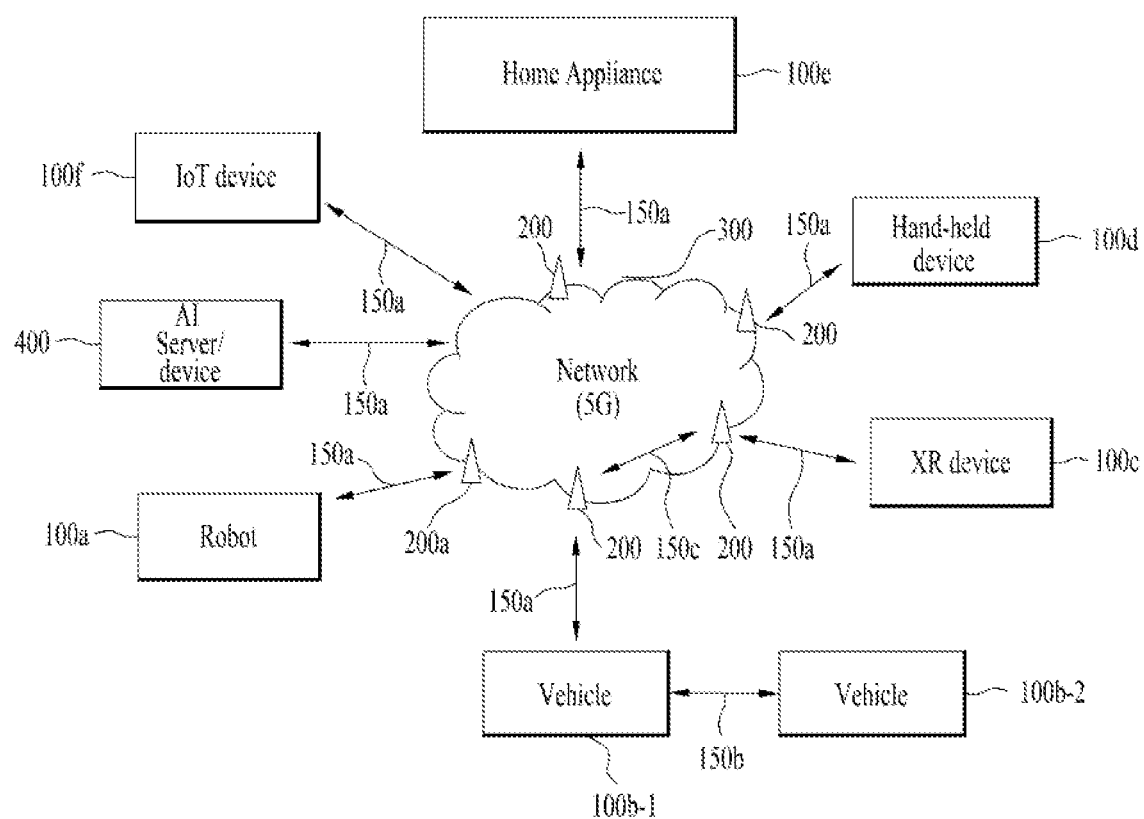
FIG. 2A illustrates a communication system applied to the present disclosure.

FIG. 2A illustrates a communication system 1 applied to the present disclosure.

Referring to FIG. 2A, the communication system 1 applied to the present disclosure includes wireless devices, BSs, and a network. The wireless devices refer to devices performing communication by radio access technology (RAT) (e.g., 5G new RAT (NR) or LTE), which may also be called communication/radio/5G devices. The wireless devices may include, but no limited to, a robot $100a$, vehicles $100b$-1 and $100b$-2, an extended reality (XR) device $100c$, a hand-held device $100d$, a home appliance $100e$, an IoT device $100f$, and an artificial intelligence (AI) device/server 400. For example, the vehicles may include a vehicle equipped with a wireless communication function, an autonomous driving vehicle, and a vehicle capable of performing vehicle-to-vehicle (V2V) communication. The vehicles may include an unmanned aerial vehicle (UAV) (e.g., a drone). The XR device may include an augmented reality (AR)/virtual reality (VR)/mixed reality (MR) device, and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smartpad, a wearable device (e.g., a smartwatch or smart glasses), and a computer (e.g., a laptop). The home appliance may include a TV, a refrigerator, and a washing machine. The IoT device may include a sensor and a smart meter. For example, the BSs and the network may be implemented as wireless devices, and a specific wireless device $200a$ may operate as a BS/network node for other wireless devices.

The wireless devices $100a$ to $100f$ may be connected to the network 300 via the BSs 200. An AI technology may be applied to the wireless devices $100a$ to $100f$, and the wireless devices $100a$ to $100f$ may be connected to the AI server 400 via the network 300. The network 300 may be configured by using a 3G network, a 4G (e.g., LTE) network, or a 5G (e.g., NR) network. Although the wireless devices $100a$ to $100f$ may communicate with each other through the BSs 200/network 300, the wireless devices $100a$ to $100f$ may perform direct communication (e.g., sidelink communication) with each other without intervention of the BSs/network. For example, the vehicles $100b$-1 and $100b$-2 may perform direct communication (e.g. V2V/vehicle-to-everything (V2X) communication). The IoT device (e.g., a sensor) may perform direct communication with other IoT devices (e.g., sensors) or other wireless devices $100a$ to $100f$.

Wireless communication/connections $150a$, $150b$, or $150c$ may be established between the wireless devices $100a$ to $100f$ and the BSs 200, or between the BSs 200. Herein, the wireless communication/connections may be established through various RATs (e.g., 5G NR) such as UL/DL communication $150a$, sidelink communication $150b$ (or, D2D communication), or inter-BS communication $150c$ (e.g. relay, integrated access backhaul (IAB)). A wireless device and a BS/a wireless devices, and BSs may transmit/receive radio signals to/from each other through the wireless communication/connections $150a$, $150b$, and $150c$. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 2B:
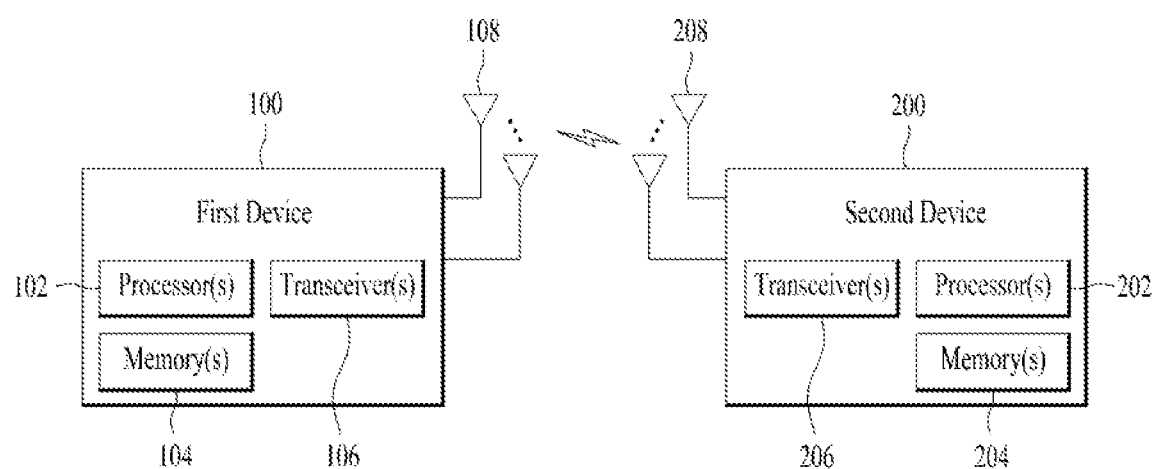
FIG. 2B illustrates wireless devices applicable to the present disclosure.

FIG. 2B illustrates wireless devices applicable to the present disclosure.

Referring to FIG. 2B, a first wireless device 100 and a second wireless device 200 may transmit radio signals through a variety of RATs (e.g., LTE and NR). Herein, {the first wireless device 100 and the second wireless device 200} may correspond to {the wireless devices $100a$ to $100f$ and the BSs 200} and/or {the wireless devices $100a$ to $100f$ and the wireless devices $100a$ to $100f$} of FIG. 2A.

The first wireless device 100 may include at least one processor 102 and at least one memory 104, and may further include at least one transceiver 106 and/or at least one antenna 108. The processor 102 may control the memory 104 and/or the transceiver 106 and may be configured to implement the descriptions, functions, procedures, proposals, methods, and/or operational flowcharts disclosed in this document. For example, the processor 102 may process information within the memory 104 to generate first information/signal and then transmit a radio signal including the first information/signal through the transceiver 106. The processor 102 may receive a radio signal including second information/signal through the transceiver 106 and then store information obtained by processing the second information/signal in the memory 104. The memory 104 may be coupled to the processor 102 and store various types of information related to operations of the processor 102. For example, the memory 104 may store software code including commands for performing a part or all of processes controlled by the processor 102 or for performing the descriptions, functions, procedures, proposals, methods, and/or operational flowcharts disclosed in this document. Herein, the processor 102 and the memory 104 may be a part of a communication modem/circuit/chip designed to implement an RAT (e.g., LTE or NR). The transceiver 106 may be coupled to the processor 102 and transmit and/or receive radio signals through the at least one antenna 108. The transceiver 106 may include a transmitter and/or a receiver. The transceiver 106 may be interchangeably used with an RF unit. In the present disclosure, a wireless device may refer to a communication modem/circuit/chip.

The second wireless device 200 may include at least one processor 202 and at least one memory 204, and may further include at least one transceiver 206 and/or at least one antenna 208. The processor 202 may control the memory 204 and/or the transceiver 206 and may be configured to implement the descriptions, functions, procedures, proposals, methods, and/or operational flowcharts disclosed in this document. For example, the processor 202 may process information within the memory 204 to generate third information/signal and then transmit a radio signal including the third information/signal through the transceiver 206. The processor 202 may receive a radio signal including fourth information/signal through the transceiver 206 and then store information obtained by processing the fourth information/signal in the memory 204. The memory 204 may be coupled to the processor 202 and store various types of information related to operations of the processor 202. For example, the memory 204 may store software code including commands for performing a part or all of processes controlled by the processor 202 or for performing the descriptions, functions, procedures, proposals, methods, and/or operational flowcharts disclosed in this document. Herein, the processor 202 and the memory 204 may be a part of a communication modem/circuit/chip designed to implement an RAT (e.g., LTE or NR). The transceiver 206 may be coupled to the processor 202 and transmit and/or receive radio signals through the at least one antenna 208. The transceiver 206 may include a transmitter and/or a receiver. The transceiver 206 may be interchangeably used with an RF unit. In the present disclosure, a wireless device may refer to a communication modem/circuit/chip.

Hereinafter, hardware elements of the wireless devices 100 and 200 will be described in greater detail. One or more protocol layers may be implemented by, but not limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more protocol data units (PDUs) and/or one or more service data units (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented in hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operational flowcharts disclosed in this document may be implemented in firmware or software, which may be configured to include modules, procedures, or functions. Firmware or software configured to perform the descriptions, functions, procedures, proposals, methods, and/or operational flowcharts disclosed in this document may be included in the one or more processors 102 and 202, or may be stored in the one or more memories 104 and 204 and executed by the one or more processors 102 and 202. The descriptions, functions, procedures, proposals, methods, and/or operational flowcharts disclosed in this document may be implemented as code, instructions, and/or a set of instructions in firmware or software.

The one or more memories 104 and 204 may be coupled to the one or more processors 102 and 202 and store various types of data, signals, messages, information, programs, code, instructions, and/or commands. The one or more memories 104 and 204 may be configured as read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be coupled to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be coupled to the one or more processors 102 and 202 and transmit and receive radio signals. For example, the one or more processors 102 and 202 may control the one or more transceivers 106 and 206 to transmit user data, control information, or radio signals to one or more other devices. The one or more processors 102 and 202 may control the one or more transceivers 106 and 206 to receive user data, control information, or radio signals from one or more other devices. The one or more transceivers 106 and 206 may be coupled to the one or more antennas 108 and 208 and configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 2C:
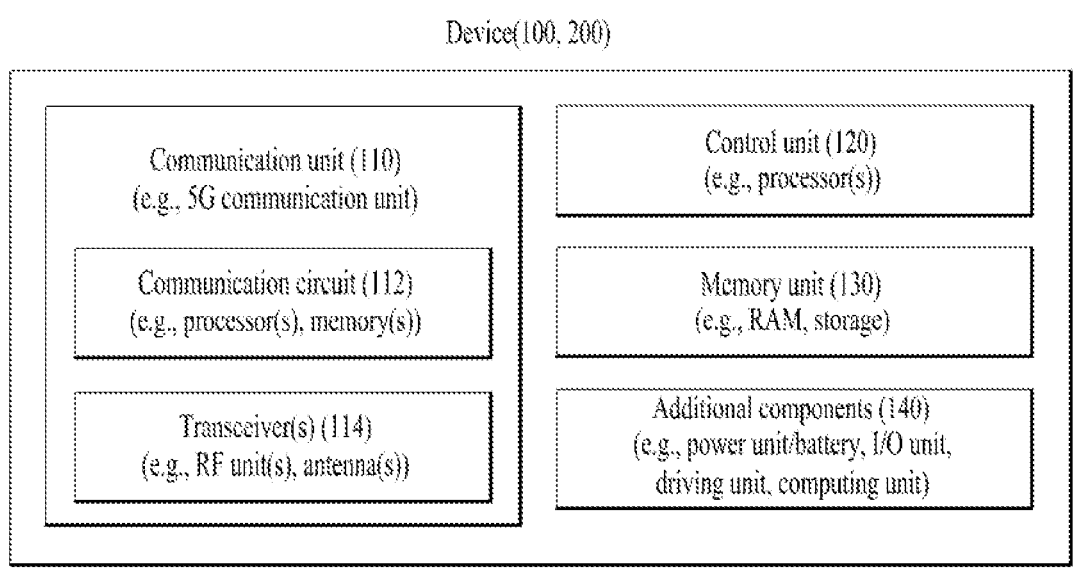
FIG. 2C illustrates another example of wireless devices applied to the present disclosure.

FIG. 2C illustrates another example of wireless devices applied to the present disclosure.

The wireless devices may be implemented in various forms according to use-cases/services (refer to FIG. 2A).

Figure 24:
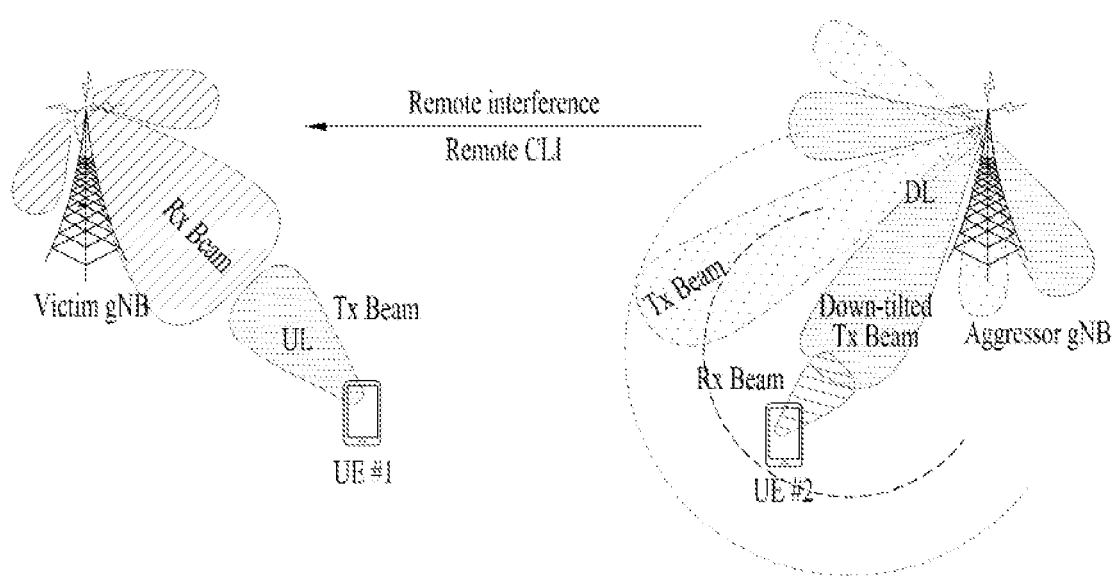
FIG. 24 illustrates a method of reducing remote CLI using down-tilting of an aggressor gNB according to the present disclosure.

Referring to FIG. 2C, wireless devices 100 and 200 may correspond to the wireless devices 100 and 200 of FIG. 24 and may be configured as various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 2B. For example, the transceiver(s) 114 may include the one or more transceivers 106 and 206 and/or the one or more antennas 108 and 208 of FIG. 2B. The control unit 120 is electrically coupled to the communication unit 110, the memory unit 130, and the additional components 140 and provides overall control to operations of the wireless devices. For example, the control unit 120 may control an electric/mechanical operation of the wireless device based on programs/code/commands/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to the types of wireless devices. For example, the additional components 140 may include at least one of a power unit/battery, an input/output (I/O) unit, a driver, and a computing unit. The wireless device may be configured as, but not limited to, the robot (100a of FIG. 2A), the vehicles (100b-1 and 100b-2 of FIG. 2A), the XR device (100c of FIG. 2A), the hand-held device (100d of FIG. 2A), the home appliance (100e of FIG. 2A), the IoT device (100f of FIG. 2A), a digital broadcasting terminal, a hologram device, a public safety device, an MTC device, a medicine device, a FinTech device (or a finance device), a security device, a climate/environment device, the AI server/device (400 of FIG. 2A), the BSs (200 of FIG. 2A), a network node, etc. The wireless device may be mobile or fixed according to a use-case/service.

In FIG. 2C, all of the various elements, components, units/portions, and/or modules in the wireless devices 100 and 200 may be coupled to each other through a wired interface or at least a part thereof may be wirelessly coupled to each other through the communication unit 110. For example, in each of the wireless devices 100 and 200, the control unit 120 and the communication unit 110 may be coupled by wire, and the control unit 120 and first units (e.g., 130 and 140) may be wirelessly coupled through the communication unit 110. Each element, component, unit/portion, and/or module within the wireless devices 100 and 200 may further include one or more elements. For example, the control unit 120 may be configured as a set of one or more processors. For example, the control unit 120 may be configured as a set of a communication control processor, an application processor, an electronic control unit (ECU), a graphical processing unit, and a memory control processor. In another example, the memory unit 130 may be configured as a random access memory (RAM), a dynamic RAM (DRAM), a read only memory (ROM), a flash memory, a volatile memory, a non-volatile memory, and/or a combination thereof.

Figure 3:
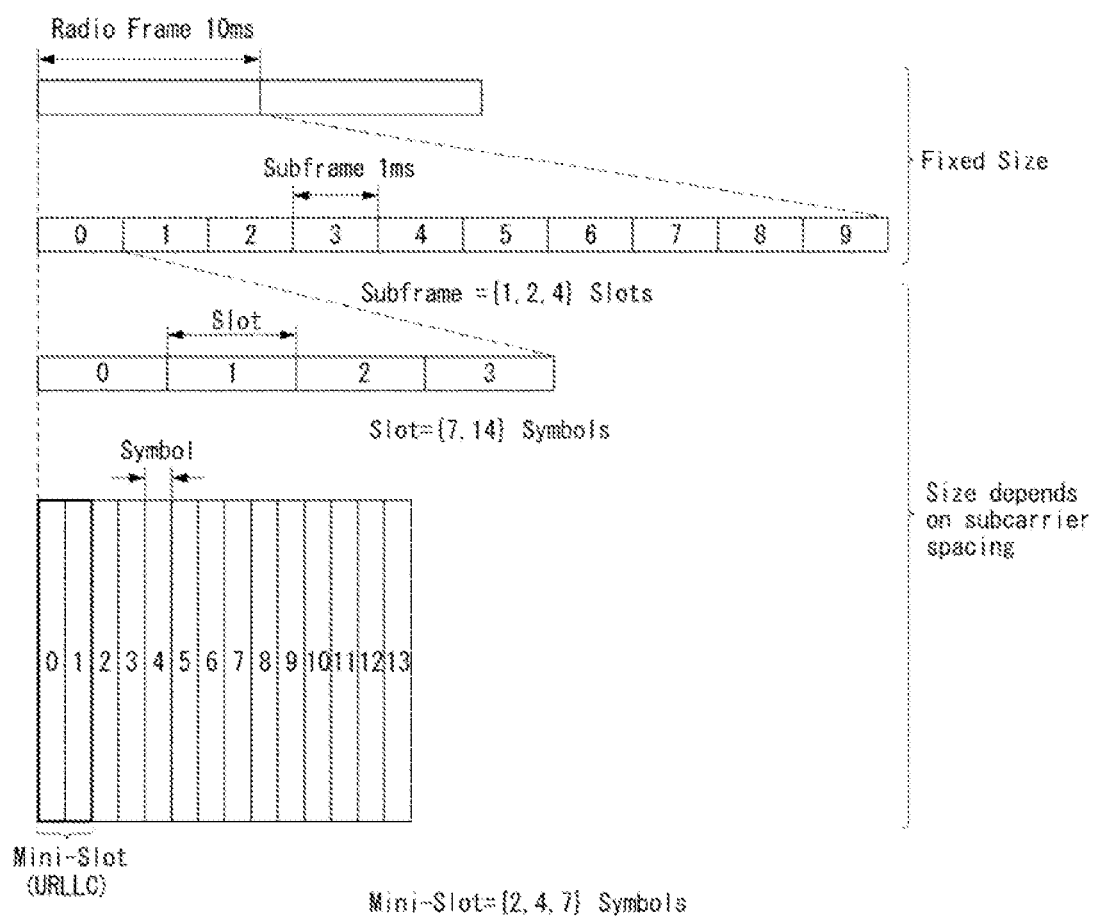
FIG. 3 is a diagram illustrating a frame structure in NR.

FIG. 3 is a diagram illustrating a frame structure in NR.

The NR system may support multiple numerologies. A numerology may be defined by a subcarrier spacing (SCS) and a cyclic prefix (CP) overhead. Multiple SCSs may be derived by scaling a default SCS by an integer N (or u). Further, even though it is assumed that a very small SCS is not used in a very high carrier frequency, a numerology to be used may be selected independently of a frequency band. Further, the NR system may support various frame structures according to multiple numerologies.

Now, a description will be given of OFDM numerologies and frame structures which may be considered for the NR system. Multiple OFDM numerologies supported by the NR system may be defined as listed in Table 1.

TABLE 1

| $\mu$ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (e.g., subcarrier spacings) to support various 5G services. For example, when a subcarrier spacing is 15 kHz, a wide area in traditional cellular bands is supported. When the subcarrier spacing is 30 kHz or 60 kHz, a dense-urban, lower latency, and wider carrier bandwidth are supported. When the subcarrier spacing is 60 kHz or higher, bandwidth greater than 24.25 GHz is supported to overcome phase noise.

An NR frequency band defines two types of frequency ranges FR1 and FR2. FR1 may represent a sub-6 GHz range, and FR2 may represent an above-6 GHz range as a millimeter wave (mmW).

Table 2 below shows definition of the NR frequency band.

TABLE 2

| Frequency Range designation | Corresponding frequency range | Subcarrier Spacing |
|---|---|---|
| FR1 | 450 MHz–6000 MHz | 15, 30, 60 kHz |
| FR2 | 24250 MHz–52600 MHz | 60, 120, 240 kHz |

Regarding a frame structure in the NR system, the time-domain sizes of various fields are represented as multiples of a basic time unit, $T_s=1/(\Delta f_{max} \cdot N_f)$ where $\Delta f_{max}=480 \cdot 10^3$ and $N_f=4096$. DL and UL transmissions are organized into radio frames each having a duration of $T_f=(\Delta f_{max} N_f/100) \cdot T_s=10$ ms. Each radio frame includes 10 subframes each having a duration of $T_{sf}=(\Delta f_{max} N_f/1000) \cdot T_s=1$ ms. this case, there may exist one set of frames for UL and one set of frames for DL. Further, transmission of UL frame #i from the UE should state a time $T_{TA}=N_{TA}T_s$ before the start of a corresponding DL frame. For a numerology slots are numbered with $n_s^\mu \in \{0, \ldots, N_{subframe}^{slots,\mu}-1\}$ in an increasing order in a subframe, and with $n_{s,f}^\mu \in \{0, \ldots, N_{frame}^{slots,\mu}-1\}$ in an increasing order in a radio frame. One slot includes $N_{symb}^\mu$ consecutive OFDM symbols, and $N_{symb}^\mu$ depends on a used numerology and slot configuration. The start of a slot $n_s^\mu$ in a subframe is aligned in time with the start of an OFDM symbol $n_s^\mu N_{symb}^\mu$ in the same subframe. All UEs are not capable of simultaneous transmission and reception, which implies that all OFDM symbols of a DL slot or a UL slot may not be used. Table 2 lists the number $N_{symb}^{slot}$ of symbols per slot, the number $N_{slot}^{frame,\mu}$ of slots per frame, and the number $N_{slot}^{subframe,\mu}$ of slots per subframe, for each SCS in a normal CP case, and Table 3 lists the number of symbols per slot, the number of slots per frame, and the number of slots per subframe, for each SCS in an extended CP case.

TABLE 2

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 3

| $\mu$ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 3 illustrates an example with $\mu=2$, that is, an SCS of 60 kHz, in which referring to Table 2 one subframe may include four slots. One subframe=$\{1, 2, 4\}$ slots in FIG. 2 which is exemplary, and the number of slot(s) which may be included in one subframe is defined as listed in Table 2.

Further, a mini-slot may include 2, 4 or 7 symbols, fewer symbols than 2, or more symbols than 7.

In regard to physical resources in the NR system, an antenna port, a resource grid, a resource element, a resource block, a carrier part, etc. may be considered. Hereinafter, the above physical resources that may be considered in the NR system will be described in detail.

First, in regard to the antenna port, the antenna port is defined such that a channel on which a symbol on the antenna port is conveyed is derived from a channel on which another symbol on the same antenna port is conveyed. If large-scale properties of a channel on which a symbol on one antenna port is conveyed are capable of being derived from a channel on which a symbol on another antenna port, the two antenna ports may be said to be quasi co-located (QC) or to be in a quasi co-location (QCL) relationship. The large-scale properties include one or more of delay spread, Doppler spread, frequency shift, average received power, received timing, average delay, and spatial Rx parameters. The spatial Rx parameter represents a spatial (Rx) channel property parameter such as an angle of arrival.

Figure 4:
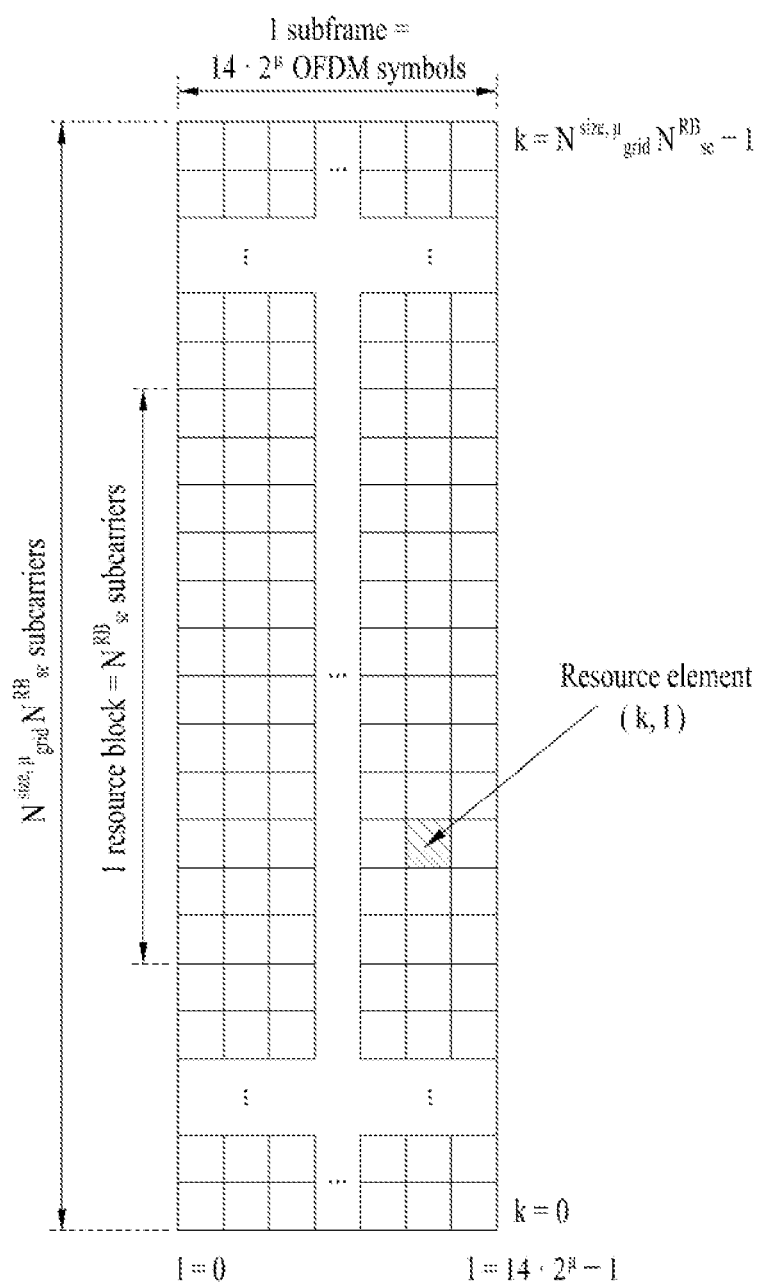
FIG. 4 illustrates a resource grid in the NR system.

FIG. 4 illustrates a resource grid in the NR system.

Referring to FIG. 4, a resource grid includes $N_{RB}^\mu N_{sc}^{RB}$ subcarriers in the time domain, and one subframe $14 \cdot 2\mu$ OFDM symbols, which is exemplary and thus should not be construed as limiting the disclosure. In the NR system, a transmitted signal is described by one or more resource grids including $N_{RB}^\mu N_{sc}^{RB}$ subcarriers and $2^\mu N_{symb}^{(\mu)}$ OFDM symbols, where $N_{RB}^\mu \leq N_{RB}^{max,\mu}$. $N_{RB}^{max,\mu}$ represents a maximum transmission bandwidth, which may be different for UL and DL as well as according to numerologies. In this case, one resource grid may be configured for each neurology $\mu$ and each antenna port p, as illustrated in FIG. 4. Each element of the resource grid for the numerology $\mu$ and the antenna port p is referred to as a resource element (RE), which is uniquely identified by an index pair $(k,\bar{l})$ where $k=0, \ldots, N_{RB}^\mu N_{sc}^{RB}-1$ is a frequency-domain index and $\bar{l}=0, \ldots 2^\mu N_{symb}^{(\mu)}-1$ indicates the position of a symbol in a subframe. An RE in a slot is indicated by an index pair $(k,l)$ where $l=0, \ldots, N_{symb}^\mu-1$. An RE $(k,\bar{l})$ for the numerology $\mu$ and the antenna port p corresponds to a complex value $a_{k,\bar{l}}^{(p,\mu)}$. When there is no risk of confusion or a specific antenna port or a numerology is not specified, the indexes p and $\mu$ may be dropped, and as a result, the complex value may be $a_{k,\bar{l}}^{(p)}$ or $a_{k,\bar{l}}$. In addition, an RB is defined as $N_{sc}^{RB}=12$ consecutive subcarriers in the frequency domain.

In the NR system, a UE may be configured to operate in part of frequency bandwidth (hereinafter, a bandwidth part (BWP)) of a cell considering that the UE may not simultaneously support a wide bandwidth to be supported.

Resource blocks of the NR system include physical resource blocks defined within a BWP and common resource blocks numbered upward from 0 in the frequency domain for subcarrier spacing configuration $\mu$.

A point A is acquired as follows.
offsetToPointA for primary cell (PCell) DL represents a frequency offset between point A and the lowest subcarrier of the lowest resource block overlapping with a synchronization signal/physical broadcast channel (SS/PBCH) used by the UE for initial cell selection and is expressed in units of resource blocks assuming a subcarrier spacing of 15 kHz for FR1 and a subcarrier spacing of 60 kHz for FR2; and absoluteFrequencyPointA for all other cases represents the frequency location of point A expressed as in an absolute radio-frequency channel number (ARFCN).

The center of the subcarrier 0 of common resource block 0 for subcarrier spacing configuration $\mu$ coincides with the point A serving as a reference point for a resource grid. The relationship between a common resource block number $n_{CRB}^\mu$ in the frequency domain and an RE $(k, l)$ for subcarrier spacing configuration $\mu$ is given by the following equation.

$$n_{CRB}^\mu = \left\lfloor \frac{k}{N_{sc}^{RB}} \right\rfloor \qquad \text{[Equation 1]}$$

where k is defined relative to point A such that $k=0$ corresponds to a subcarrier centered around point A. Physical resource blocks are numbered from 0 to $N_{BWP,i}^{size}-1$ within a BWP. Here, i is a BWP number. The relationship between the physical resource block $n_{PRB}$ in BWP i and the common resource block $n_{CRB}$ is given by Equation 2 below.

$$n_{CRB}=n_{PRB}+N_{BWP,i}^{start} \qquad \text{[Equation 2]}$$

where $N^{start}_{BWP,I}$ is a common resource block in which a BWP starts relative to common resource block 0.

Figure 5:
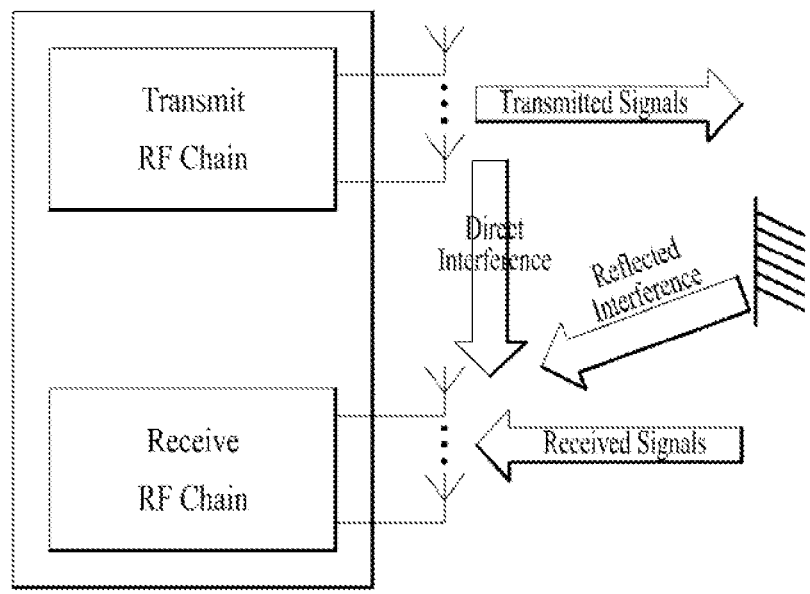
FIG. 5 is a diagram showing the concept of a transmission/reception link and self-interference (SI) in an FDR communication situation.

FIG. 5 is a diagram showing the concept of a transmission/reception link and self-interference (SI) in an FDR communication situation.

As shown in FIG. 5, SI may be divided into direct interference caused when a signal transmitted from a transmit antenna directly enters a receive antenna without path attenuation, and reflected interference reflected by peripheral topology, and the level thereof is dramatically greater than a desired signal due to a physical distance difference. Due to the dramatically large interference intensity, efficient self-IC is necessary to operate the FDR system.

To effectively operate the FDR system, self-IC requirements with respect to the maximum transmit power of devices (in the case where FDR is applied to a mobile communication system (BW=20 MHz)) may be determined as illustrated in Table 5 below.

TABLE 5

| Node Type | Max. Tx Power ($P_A$) | Thermal Noise. (BW = 20 MHz) | Receiver NF | Receiver Thermal Noise Level | Self-IC Target ($P_A$-TN-NF) |
|---|---|---|---|---|---|
| Macro eNB | 46 dBm | −101 dBm | 5 dB (for cNB) | −96 dBm | 142 dB |
| Pico eNB | 30 dBm | | | | 126 dB |
| Femto eNB, wLAN AP | 23 dBm | | | | 119 dB |
| UE | 23 dBm | | 9 dB (for BE) | −92 dBm | 115 dB |

Referring to Table 5, it may be noted that to effectively operate the FDR system in a 20-MHz BW, a UE needs 119-dBm self-IC performance. A thermal noise value may be changed to $N_{0,BW}=-174$ dBm+$10\times\log_{10}$(BW) according to the BW of a mobile communication system. In [Table 1], the thermal noise value is calculated on the assumption of a 20-MHz BW. In relation to [Table 1], for receiver noise figure (NF), a worst case is considered referring to the 3GPP specification requirements. Receiver thermal noise level is determined to be the sum of a thermal noise value and a receiver NF in a specific BW.

Types of Self-IC Schemes and Methods for Applying the Self-IC Schemes

Figure 6:
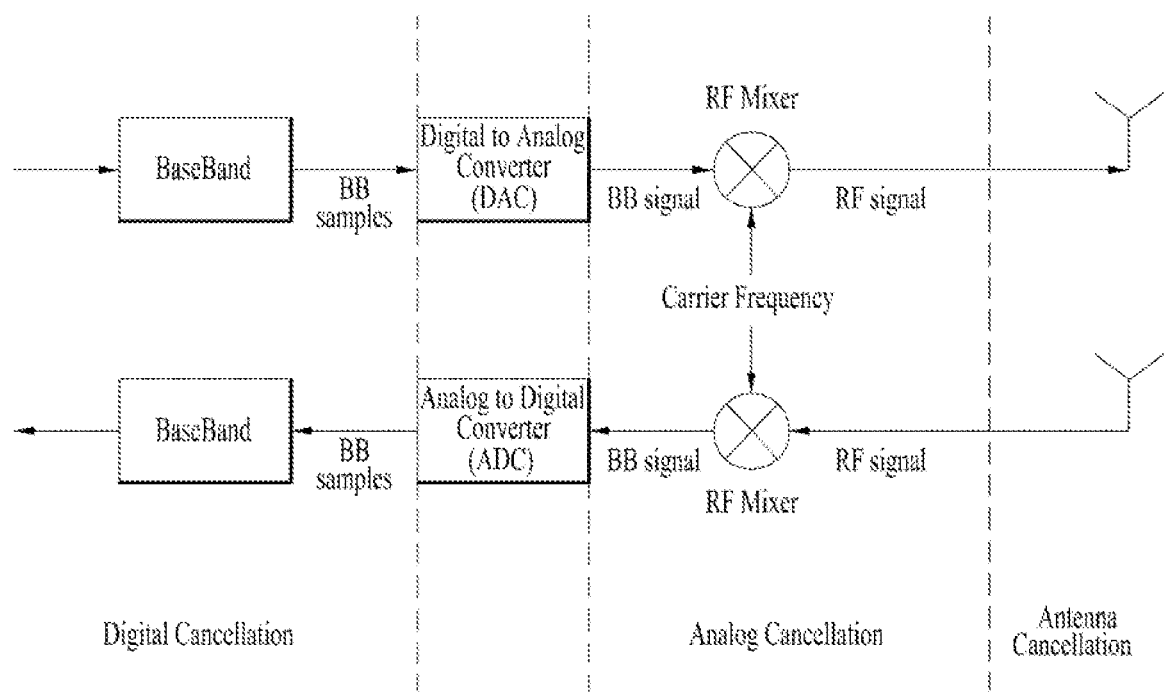
FIG. 6 is a diagram illustrating positions at which three self-IC schemes are applied, in a radio frequency (RF) Tx and Rx end (or an RF front end) of a device.

FIG. 6 is a diagram illustrating positions at which three self-IC schemes are applied, in a radio frequency (RF) Tx and Rx end (or an RF front end) of a device. Now, a brief description will be given of the three self-IC schemes.

Antenna Self-IC:

Antenna self-IC is a self-IC scheme that should be performed first of all self-IC schemes. SI is cancelled at an antenna end. Most simply, transfer of an SI signal may be blocked physically by placing a signal-blocking object between a Tx antenna and an Rx antenna, the distance between antennas may be controlled artificially, using multiple antennas, or a part of an SI signal may be canceled through phase inversion of a specific Tx signal. Further, a part of an SI signal may be cancelled by means of multiple polarized antennas or directional antennas.

Analog Self-IC:

Interference is canceled at an analog end before an Rx signal passes through an analog-to-digital convertor (ADC). An SI signal is canceled using a duplicated analog signal. This operation may be performed in an RF region or an Intermediate Frequency (IF) region. SI signal cancellation may be performed in the following specific method. A duplicate of an actually received SI signal is generated by delaying an analog Tx signal and controlling the amplitude and phase of the delayed Tx signal, and subtracted from a signal received at an Rx antenna. However, due to the analog signal-based processing, the resulting implementation complexity and circuit characteristics may cause additional distortion, thereby changing interference cancellation performance significantly.

Digital Self-IC:

Interference is canceled after an Rx signal passes through an ADC. Digital self-IC covers all IC techniques performed in a baseband region. Most simply, a duplicate of an SI signal is generated using a digital Tx signal and subtracted from an Rx digital signal. Or techniques of performing precoding/postcoding in a baseband using multiple antennas so that a Tx signal of a UE or an eNB may not be received at an Rx antenna may be classified into digital self-IC. However, since digital self-IC is viable only when a digital modulated signal is quantized to a level enough to recover information of a desired signal, there is a need for the prerequisite that the difference between the signal powers of a designed signal and an interference signal remaining after interference cancellation in one of the above-described techniques should fall into an ADC range, to perform digital self-IC.

Figure 7:
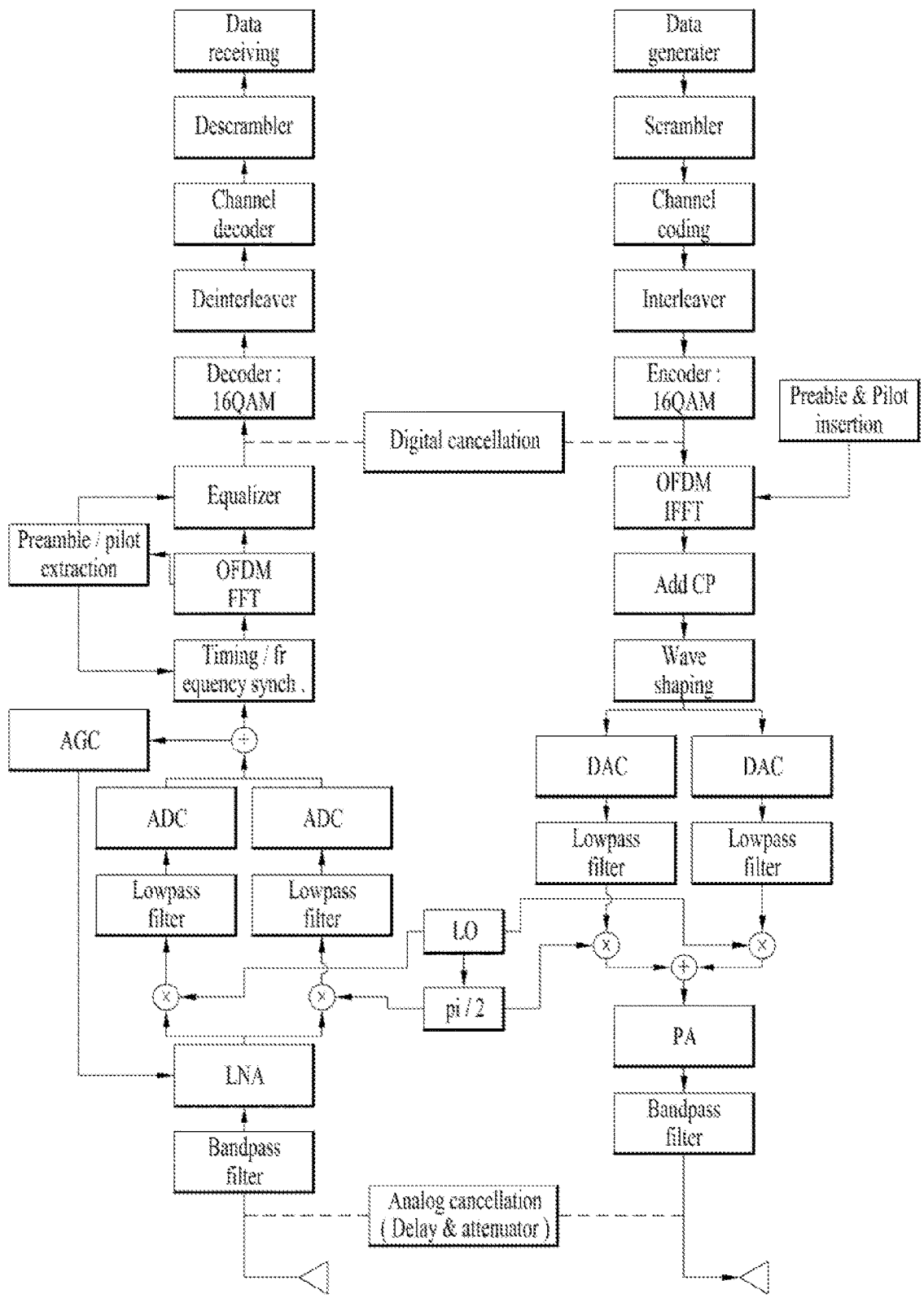
FIG. 7 is a block diagram of a self-IC device in a proposed communication apparatus in an OFDM communication environment based on FIG. 6.

FIG. 7 is a block diagram of a self-IC device in a proposed communication apparatus in an OFDM communication environment based on FIG. 6.

While FIG. 7 shows that digital self-IC is performed using digital SI information before Digital to Analog Conversion (DAC) and after ADC, it may be performed using a digital SI signal after inverse fast Fourier transform (IFFT) and before fast Fourier transform (FFT). Further, although FIG. 7 is a conceptual diagram of self-IC though separation of a Tx antenna from an Rx antenna, if antenna self-IC is performed using a single antenna, the antenna may be configured in a different manner from in FIG. 5.

Figure 8:
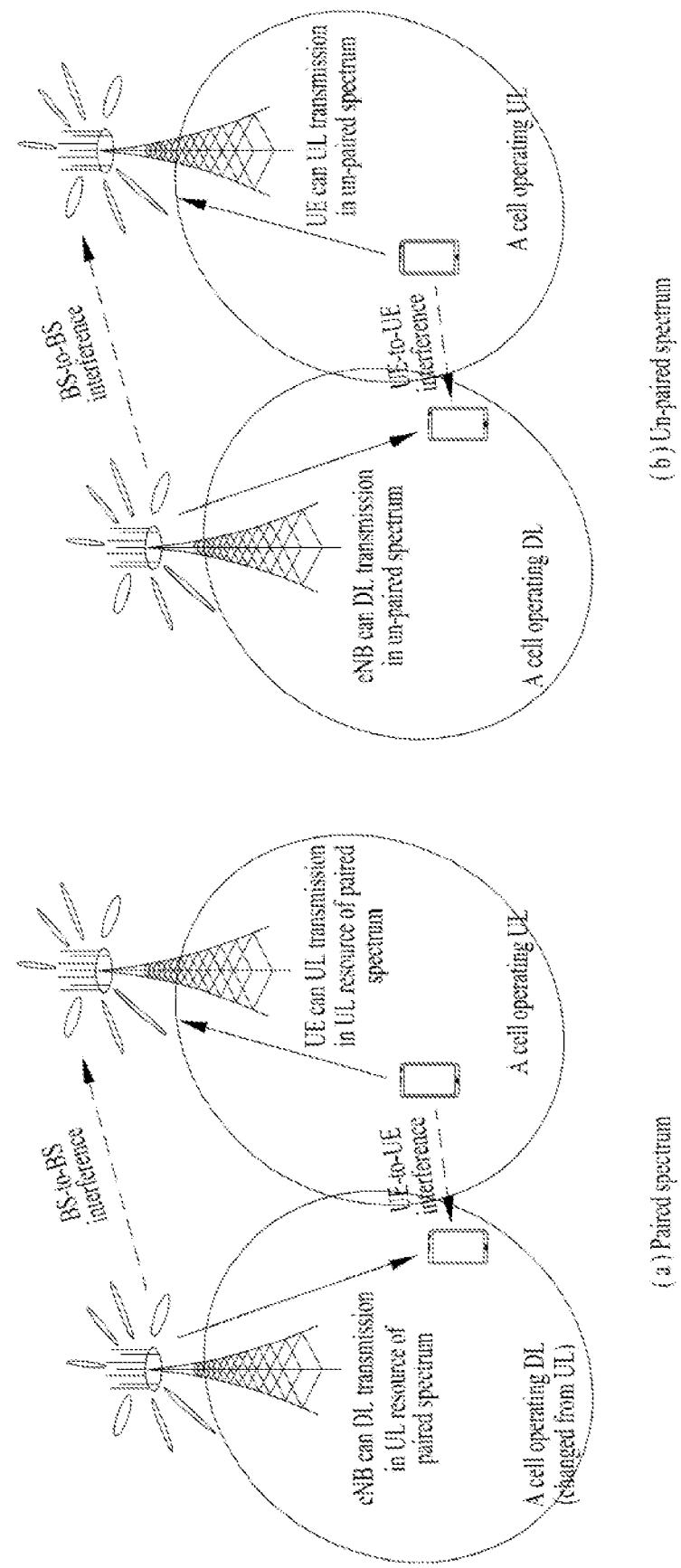
FIG. 8 is a diagram illustrating examples of cross-link interference of a time division multiplexing (TDM)-based flexible duplex operation in a paired spectrum and in an unpaired spectrum.

FIG. 8 is a diagram illustrating examples of cross-link interference of a time division multiplexing (TDM)-based flexible duplex operation in a paired spectrum and in an unpaired spectrum.

Interference that should be additionally considered in operating flexible duplex is cross-link interference. More specifically, if an adjacent BS generates a DL signal while a specific BS receives a UL signal, the DL signal of the adjacent BS serves as interference due to DL/UL operations of different directions. In addition, if an adjacent UE generates a UL signal while a specific UE receives a DL signal, the UL signal of the adjacent UE serves as interference. Such interference may be illustrated as in FIG. 8 according to a paired spectrum and an unpaired spectrum.

Hereinafter, methods of effectively applying a flexible duplex wireless transmission scheme to wireless transmission between the UE and the eNB will be proposed. The eNB expressed throughout the present invention includes a relay, a relay node, a remote radio head (RRH), and the like. The present invention also proposes examples of designing a reference signal (RS) for measuring cross-link interference generated in a flexible duplex wireless transmission scheme and performing signaling supporting such design.

The present invention explains the proposals and then describes the detailed embodiments of the proposals. The proposals and the embodiments of the proposals may be usable in a manner of being coupled or combined together. In the present invention, the crosslink interference means interference generated from a case that an interference-receiving subject is different from an interference-giving subject at a corresponding timing. For example, when the interference-receiving subject is at a DL reception timing and the interference-giving subject is at a UL transmission timing, interference generated from a UL transmission can be called crosslink interference. In the present invention, a UE/BS in position of receiving interference due to crosslink interference shall be represented as a victim UE/TRP and a UE/BS in position of giving interference shall be represented as an aggressor UE/TRP.

An example of cross-link interference in terms of the eNB will be described hereinbelow.

Figure 9:
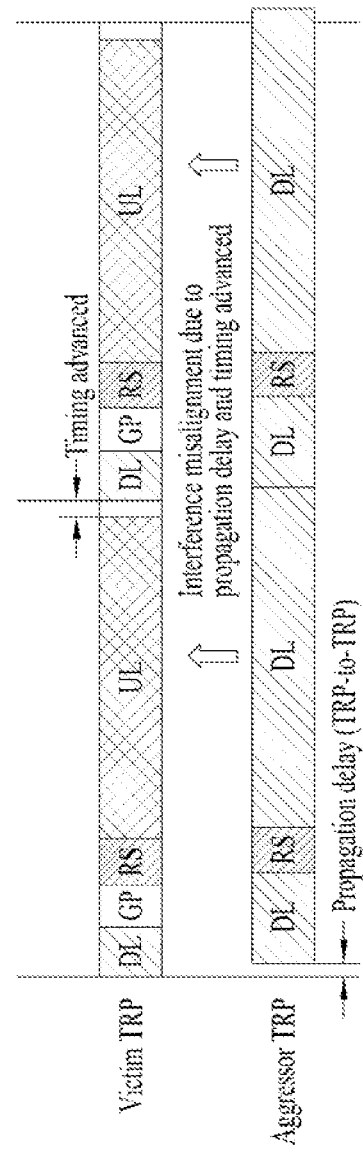
FIG. 9 is a diagram illustrating an example of a received signal and cross-link interference in a victim TRP (e.g., eNB).

FIG. 9 is a diagram illustrating an example of a received signal and cross-link interference in a victim TRP (e.g., eNB).

FIG. 9 illustrates interference caused by DL transmission of a neighbor TRP during UL reception of a TRP in a TDD-based self-contained frame structure. For convenience of description, it is assumed in FIG. 9 that an aggressor TRP and a victim TRP have the same numerology and the same frame structure. Cross-link interference in FIG. 9 may be illustrated as in, for example, FIG. 10 in terms of the UE.

Figure 10:
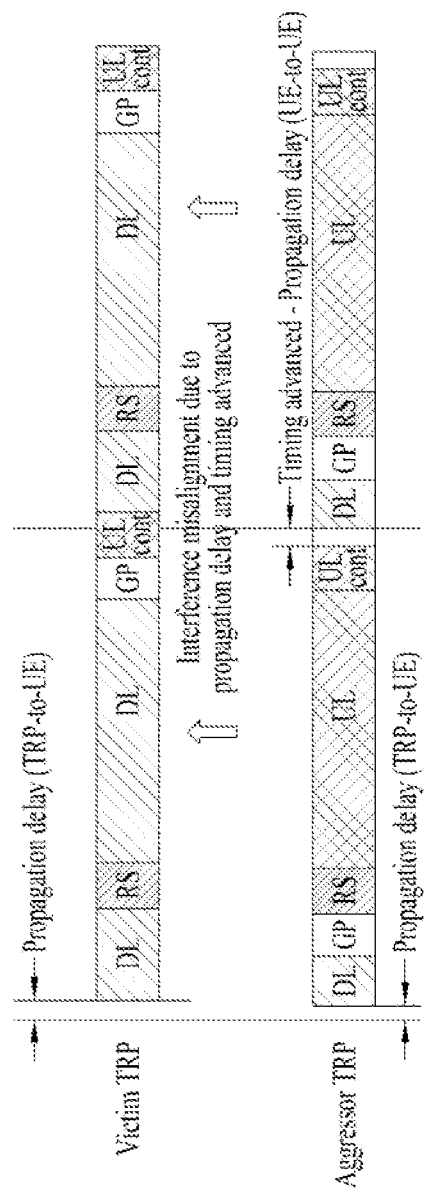
FIG. 10 is a diagram illustrating an example of a received signal and cross-link interference in a victim UE.

FIG. 10 is a diagram illustrating an example of a received signal and cross-link interference in a victim UE.

As illustrated in FIG. 10, there may be an RS added for a DL signal and an RS added for a UL signal. FIG. 10 illustrates an example in which the RS added for the DL signal and the RS added for the UL signal are located at the same position. Unlike the example of FIG. 10, the RS added for the DL signal and the RS added for the UL signal may be located at different positions.

When a specific TRP changes a DL/UL configuration for flexible duplex, cross-link interference occurs and UL reception performance of the TRP or DL reception performance of the UE may be degraded due to additional interference. Accordingly, a receiver capable of suppressing or cancelling cross-link interference is needed. However, it is necessary to estimate orthogonality (channel gain) caused by cross-link interference in order to operate the receiver. To this end, detailed proposals are given as described below.

Proposal 1

The RS may be used to estimate orthogonality of a cross-link interference signal or acquire interference information from a neighbor aggressor TRP/UE.

To suppress or cancel cross-link interference, it is necessary to estimate a channel of cross-link interference. From the viewpoint of reception of a victim TRP, cross-link interference may occur during UL reception from the aggressor TRP. From the viewpoint of reception of a victim UE, cross-link interference may occur during DL reception from the aggressor UE. Therefore, a usage range of the RS may vary according to a UL frame structure and a DL frame structure.

In cellular communication, a DM-RS has already been present for the following purposes.

DM-RS for DL: RS for demodulation of a DL control signal and a DL data signal

DM-RS for UL: RS for demodulation of a UL control signal and a UL data signal

Current 5G new RAT (NR) considers that an RS for DL and an RS for UL are commonly designed. However, since the DL RS and the UL RS may or may not be commonly designed, each of the two cases will be described hereinbelow.

Proposal 1-1

As a detailed proposal of Proposal 1, when the DL RS and the UL RS have common design (i.e., time and frequency locations are equal), DL and UL may be distinguished using different frequency resources, different time resources, or different code resources.

Figure 11:
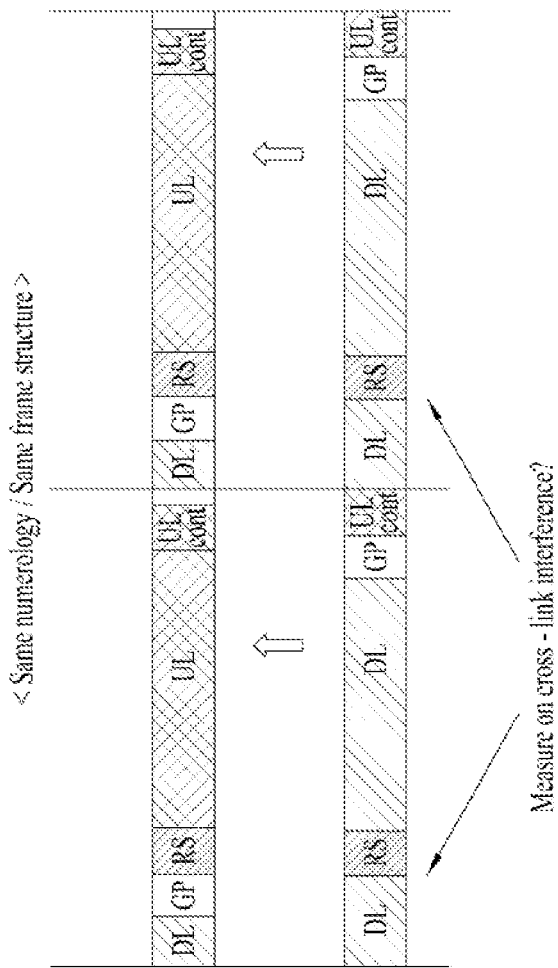
FIG. 11 is a diagram illustrating an example when a DL RS and a UL RS have common design.

FIG. 11 is a diagram illustrating an example when a DL RS and a UL RS have common design.

When the DL RS and UL RS have common design, frequency and time locations of the DL RS and the UL RS may be equal. In this situation, the DL RS and the UL RS may be distinguished by making the DL RS and the UL RS orthogonal through allocation of a resource such as a frequency resource, a time resource, or a code resource. Embodiment 1 described below is an embodiment capable of obtaining orthogonality between the DL RS and the UL RS using the frequency resource, the time resource, or the code resource.

Figure 12:
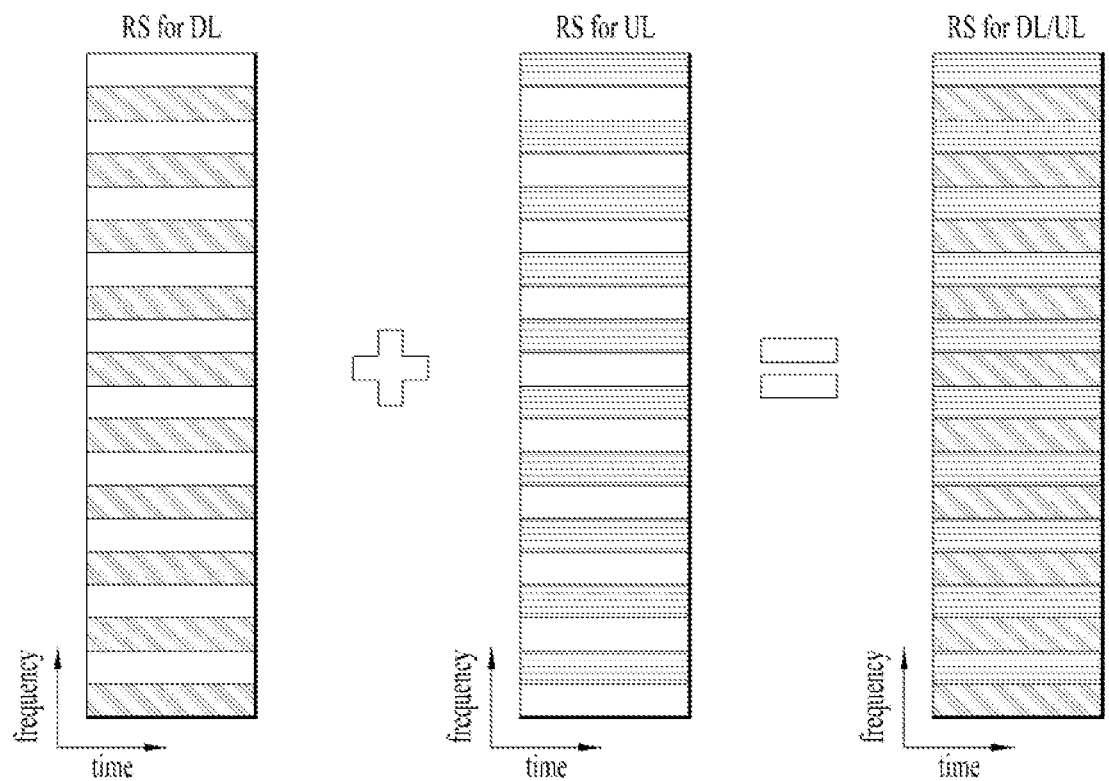
FIG. 12 is a diagram illustrating an example of allocating different frequency resources to a DL RS and a UL RS, for cross-link interference measurement

FIG. 12 is a diagram illustrating an example of allocating different frequency resources to a DL RS and a UL RS, for cross-link interference measurement.

As a detailed embodiment of Embodiment 1, Embodiment 1-1 is an embodiment capable of obtaining orthogonality between the DL RS and the UL RS using different frequency resources as in FDM. As described in the following embodiment, different frequency or physical resources are used for the DL RS and the UL RS so that orthogonality between the DL RS and the UL RS may be maintained and distinguished. In the following embodiment, the DL RS is non-continuously configured and the UL RS is non-continuously configured using frequency or physical resources which are not used for the DL RS. However, any combination using different frequency or physical resources may be used without being limited to a combination of the embodiment.

Figure 13:
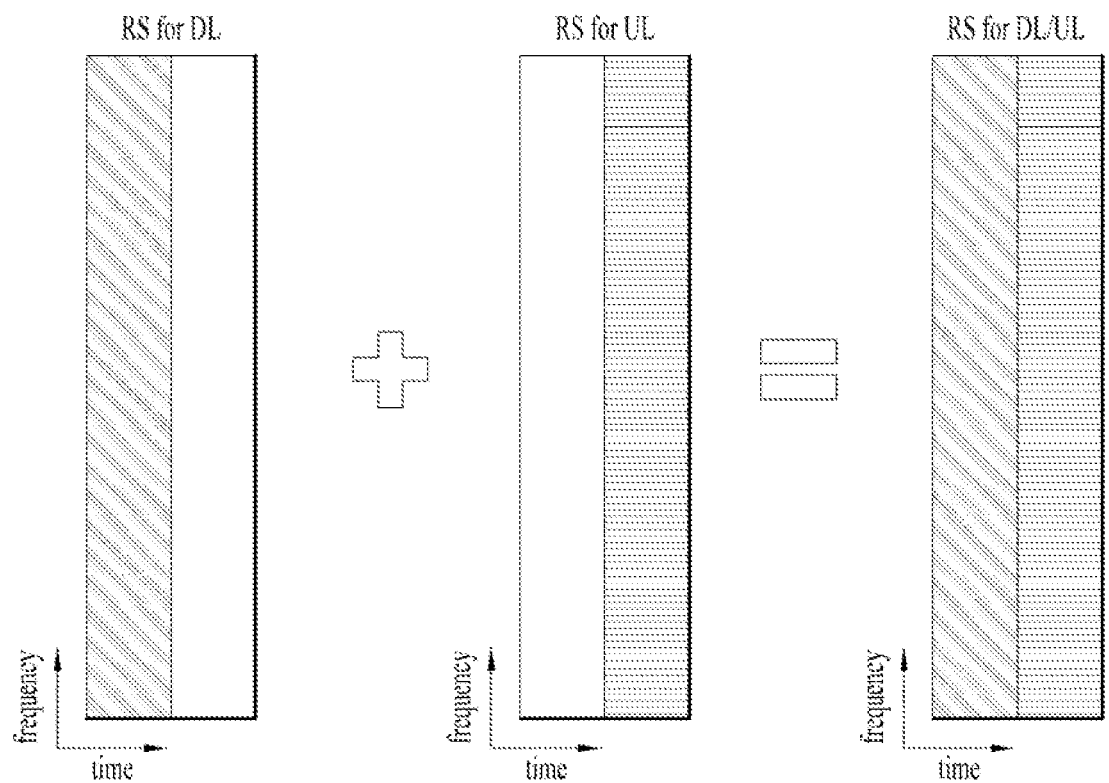
FIG. 13 is a diagram illustrating an example of doubling a base subcarrier spacing and allocating different time resources to a DL RS and a UL RS, for cross-link interference measurement.

FIG. 13 is a diagram illustrating an example of doubling a base subcarrier spacing and allocating different time resources to a DL RS and a UL RS, for cross-link interference measurement.

FIG. 13 illustrates Embodiment 1-2, as a detailed embodiment of Embodiment 1, which may obtain orthogonality between the DL RS for DL and the UL RS using different time resources.

As in the embodiment of FIG. 13, the DL RS and the UL RS may use different time resources or different symbols so that orthogonality between the DL RS and the UL RS may be maintained and distinguished. In Embodiment 1-2, a subcarrier different from a subcarrier used for traditional data transmission (e.g., 30 kHz rather than 15 kHz) is used to reduce a symbol duration so that transmission may be performed using different time resources. A specific time resource or symbol is configured for the DL RS and a time resource or symbol not used for the DL RS is configured for the UL RS. However, any combination of different time resources or symbols using a symbol duration reduced by use of other subcarrier sizes may be used without being limited to a combination of the embodiment of FIG. 13.

Figure 14:
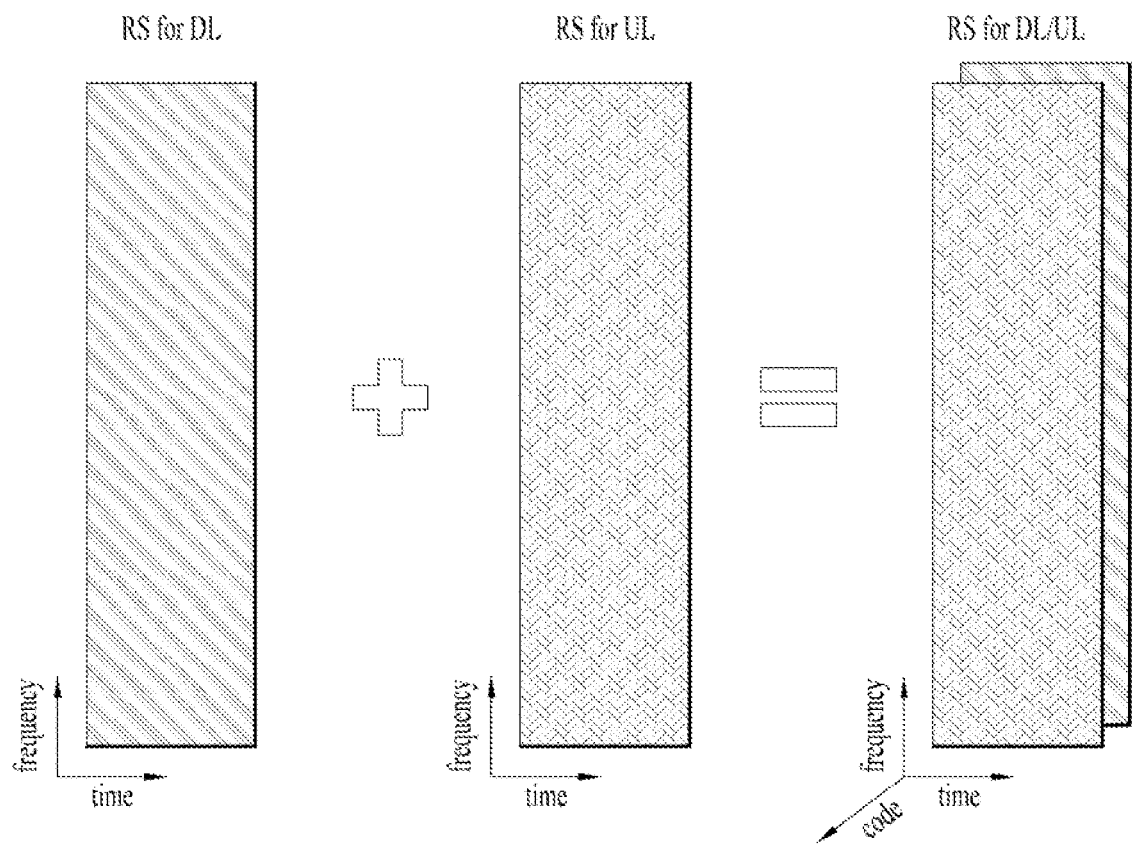
FIG. 14 is a diagram illustrating an example of allocating different code resources to a DL RS and a UL RS, for cross-link interference measurement.

FIG. 14 is a diagram illustrating an example of allocating different code resources to a DL RS and a UL RS, for cross-link interference measurement.

FIG. 14 illustrates Embodiment 1-3, as a detailed embodiment of Embodiment 1, which may obtain orthogonality between the DL RS and the UL RS using code resources.

As illustrated in Embodiment 1-3, the DL RS and the UL RS use different orthogonal codes so that orthogonality between the DL RS and the UL RS may be maintained and distinguished. In Embodiment 1-3, a specific code is configured for the DL RS a code orthogonal to the code used for the DL RS is configure for the UL RS. However, any combination using different orthogonal codes may be used without being limited to a combination of the embodiment.

Furthermore, any combination of Embodiment 1-1, Embodiment 1-2, and Embodiment 1-3 may be used. For example, a combination of Embodiment 1-1 and Embodiment 1-3 may be configured to use different frequency resources between groups of specific TRPs and use different codes within a group.

In Proposal 1, orthogonality between DL and UL should be considered during design of legacy RSs and orthogonality corresponding to the number of TRPs should be guaranteed if cross-link interference from a plurality of TRPs needs to be measured. In this case, due to change in the legacy RSs, legacy MIMO multi-port transmission may be limited. Therefore, in consideration of disadvantages of the above proposed method, another approach is needed.

For orthogonality, it is necessary to exchange information about the DL RS and the UL RS between TRPs. For interference cancellation and channel estimation in a victim TRP, a DL RS of an aggressor TRP and a UL RS of the victim TRP should be orthogonal. Therefore, the victim TRP may exchange RS information with the aggressor TRP or transmit RS information to be used so that the aggressor TRP may select an orthogonal resource. In the case of UE-to-UE interference, orthogonality is needed between DL of the victim TRP and UL of the aggressor TRP. In this case, since each UE may have different aggressor TRP UL UEs, the UE may select an RS resource of DL based on information about aggressor UEs of each UE. In this case, DL RSs distinguished between UEs may be used. A scheme in which each UE detects aggressor UEs includes a procedure of performing measurement using an RACH and a sounding reference signal (SRS) with respect to all UEs and then performing reporting or performing estimation based on locations of the UEs, grouping the UEs, and performing measurement upon the grouped UEs.

In summary, more characteristically, an RS used in DL of the aggressor TRP may be differently configured according to a victim RS set. From the viewpoint of the UE, this means that RSs may be differently configured or used on a DL resource of the aggressor TRP and a DL resource of the victim TRP. This may be dynamically indicated or may be semi-statically configured. In addition, an RS resource used in UL of an aggressor TRP may be similarly changed according to situation.

Figure 15A:
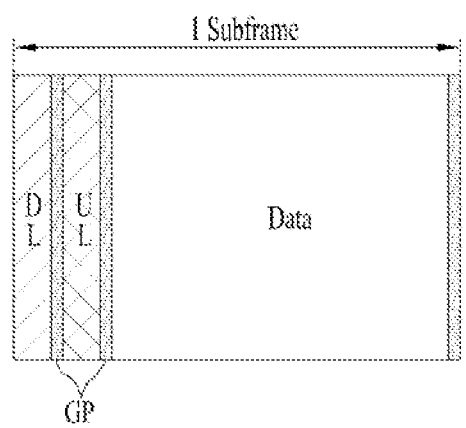
FIG. 15A and FIG. 15B are a diagram showing an example of a self-contained subframe structure.
Figure 15B:
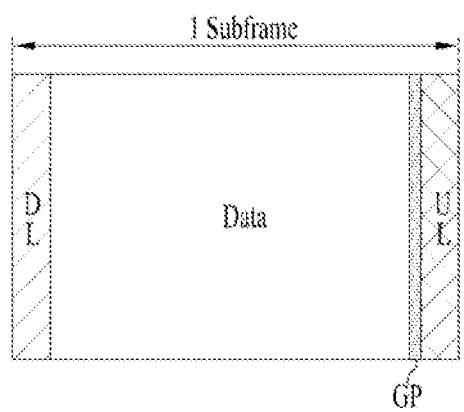

FIG. 15A and FIG. 15B are a diagram showing an example of a self-contained subframe structure.

FIG. 15A and FIG. 15B show a self-contained subframe structure to meet a low delay requirement among 5G performance requirements. Regarding a TDD based self-contained subframe structure, resource intervals (e.g., DL control channel and a UL control channel) for DL and UL exits within a single subframe. And, a guard period (GP) for solving a problem of interference between DL and UL and a resource interval exist as well.

FIG. 15A shows one example of a self-contained subframe structure. A subframe is configured in order of resource intervals for DL-UL-data and each GP exists between the resource intervals. In FIG. 15A, a DL resource interval denoted by DL may be a resource interval for a DL control channel and a UL resource interval denoted by UL may be a resource interval for a UL control channel.

FIG. 15B shows one example of a self-contained subframe structure. A subframe is configured in order of resource intervals for DL-data-UL and a GP exists in front of the UL resource interval only. Likewise, in FIG. 15B, a DL resource interval denoted by DL may be a resource interval for a DL control channel and a UL resource interval denoted by UL may be a resource interval for a UL control channel.

According to the present disclosure, a problem of remote cross-link interference (CLI) in which a DL signal of a next generation node B (gNB) interferes with a UL signal of a distant gNB may be solved by an atmospheric duct. Remote CLI may be symmetrically or asymmetrically generated.

Remote CLI may also be interpreted as remote interference.

Figure 16A:
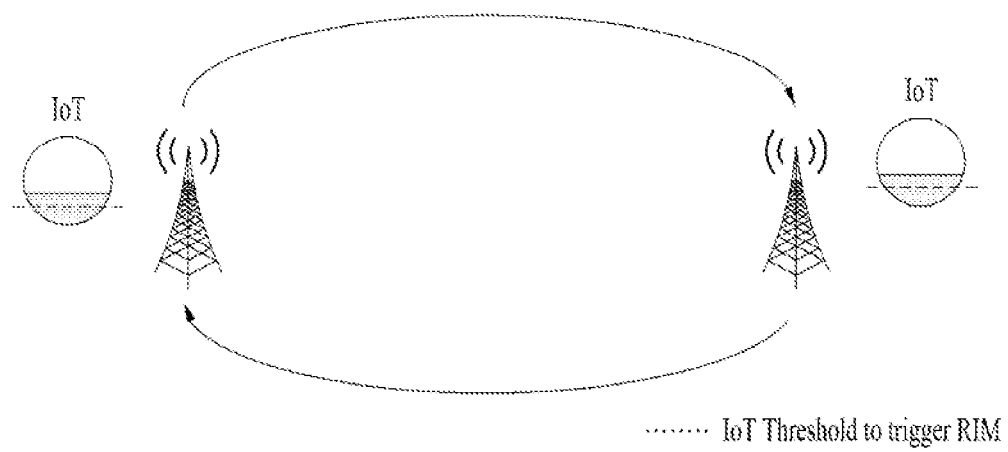
FIGS. 16A and 16B illustrate occurrence of symmetric remote cross-link interference (CLI).
Figure 16B:
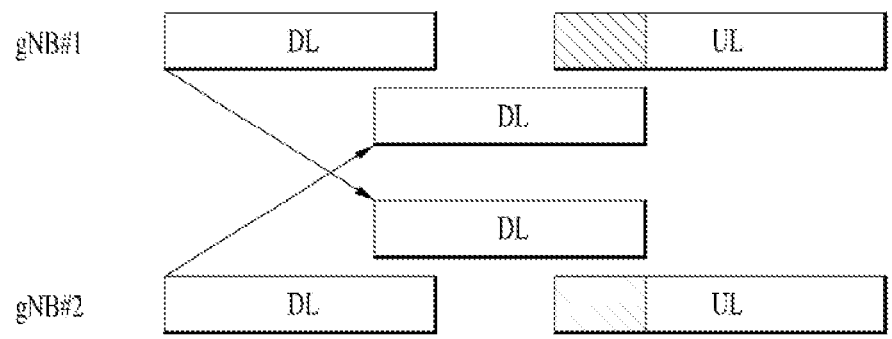

FIGS. 16A and 16B illustrate occurrence of symmetric remote CLI.

Referring to FIG. 16A, each of two distant gNBs may generate remote CLI, and a part of a DL signal transmitted by one gNB may generate interference during UL reception of another gNB by propagation delay. In FIG. 16B, it may be assumed that an interference channel maintains channel reciprocity in a TDD frame structure. Remote CLI may be changed based on propagation delay or a guard time (or GP) between a DL signal and a UL signal.

FIG. 16B is a diagram for explaining a simple symmetric remote interference scenario in a method of reducing remote CLI according to the present disclosure.

Referring to FIG. 16B, in a typical TDD situation, when a first gNB (gNB #1) and a second gNB (gNB #2) use the same TDD UL/DL configuration, a DL signal transmitted by the first gNB will not interfere with a UL signal of the second gNB due to a GP between the DL signal and the UL signal. However, since the DL signal transmitted by the first gNB may further propagate by an atmosphere duct, the DL signal of the first gNB may interfere with the UL signal of the second gNB that is distance from the first gNB. Likewise, a DL signal of the second gNB may interfere with a UL signal of the first gNB.

Figure 17:
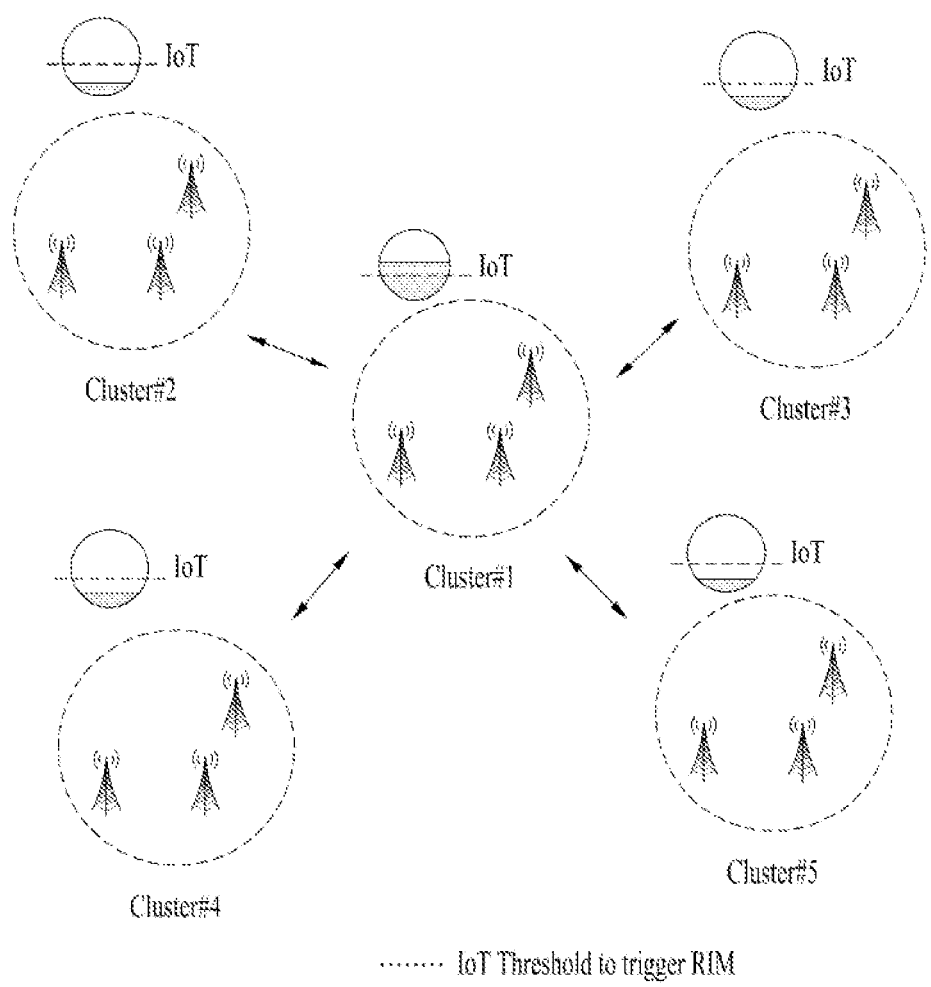
FIG. 17 is a diagram for explaining occurrence of asymmetric remote CLI by a plurality of gNBs according to the present disclosure.

FIG. 17 is a diagram for explaining occurrence of asymmetric remote CLI by a plurality of gNBs according to the present disclosure.

When there are multiple gNBs, asymmetric remote CLI may occur. In particular, when there are multiple clusters, each of which is a set of gNBs, clusters that receive a lot of interference from neighboring clusters may be present and clusters that receive less interference from neighboring clusters may be present. Therefore, clusters may be subjected to different remote CLI. If the number of gNBs included in each cluster is different, asymmetric remote CLI may occur.

Hereinafter, a method of measuring and managing remote CLI will be described.

Figure 18A:
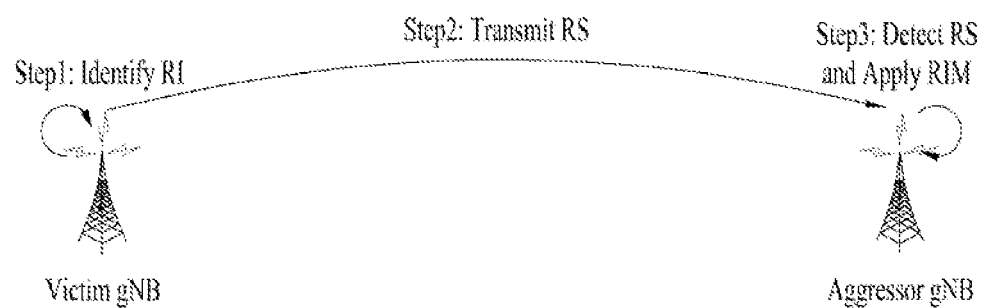
FIGS. 18A and 18B are diagrams for explaining a one-way over-the-air (OTA)-based approach according to the present disclosure.
Figure 18B:
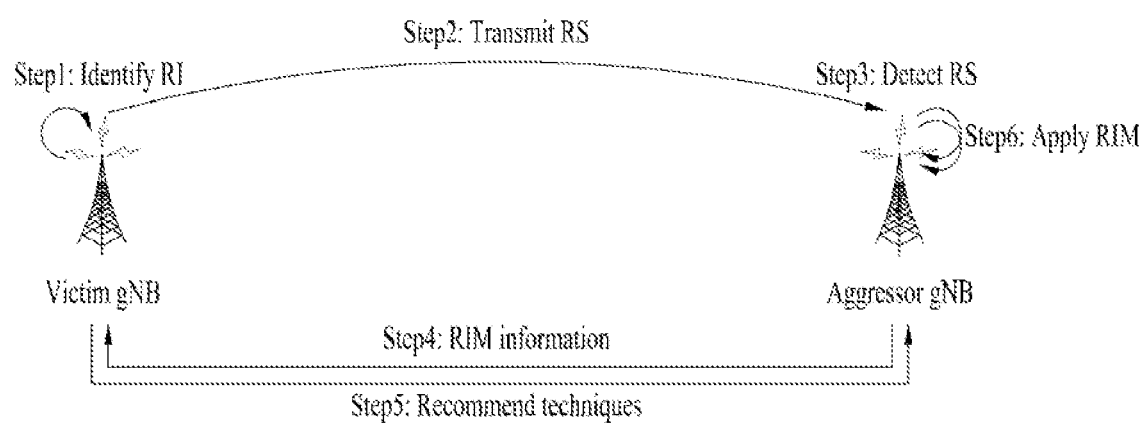

FIGS. 18A and 18B are diagrams for explaining a one-way over-the-air (OTA)-based approach according to the present disclosure.

[One-Way OTA-Based Approach-1)]
1. Step 1: A victim gNB identifies that remote CLI has occurred.
2. Step 2: The victim gNB broadcasts a predetermined signal to complain to aggressor gNBs about occurrence of remote CLI.
3. Step 3: An aggressor gNB detects the complaint signal transmitted by the victim gNB and then resolves interference in a corresponding symbol.
4. Step 4: The victim gNB continues to perform Step 1 to Step 3 until interference falls below a threshold.

Although interference does not occur well between distant gNBs, one gNB may cause interference with respect to another distant gNB due to an atmospheric duct effect. In this case, the gNB that causes interference may be referred to as an aggressor gNB. The gNB affected by interference may be a victim gNB.

Depending on the atmospheric duct effect, interference may occur in two ways or may occur in one way. When interference occurs in two ways, symmetric CLI may occur. In addition, when remote CLI occurs in one way due to the atmospheric duct effect, asymmetric CLI may occur. As described above, when interference occurs in two ways, the aggressor gNB and the victim gNB may perform their roles in reverse. That is, when the atmospheric duct effect occurs in two ways, a gNB may be an aggressor gNB and a victim gNB at the same time. When the atmospheric duct effect occurs in two ways, the relationship between the aggressor gNB and the victim gNB may maintain reciprocity. In general, the atmospheric duct effect may occur reciprocally. In exceptional cases, the atmospheric duct effect may be asymmetric. As described above, even if there is a reciprocal relationship between the aggressor gNB and the victim gNB, asymmetric remote CLI may be generated between the gNBs according to the configuration of the gNBs (number of gNBs, a cluster of gNBs, and a group of gNBs).

As an aspect of the present disclosure, in a method of reducing remote CLI, the victim gNB may recognize that remote CLI has occurred by the aggressor gNB that is distant therefrom. However, the victim gNB is incapable of specifying the aggressor gNB using only the recognized remote CLI. Therefore, the victim gNB may generate a signal indicating that remote CLI has occurred and then broadcast the generated signal. The broadcast signal may be referred to as the complaint signal. The aggressor gNB may receive the complaint signal and determine whether a signal transmitted thereby causes interference with respect to the victim gNB based on the complaint signal. Then, the aggressor gNB may not transmit signals that cause interference with respect to the victim gNB or reduce power, thereby mitigating or canceling interference. Since the aggressor gNB receives the complaint signal on a predetermined broadcast channel, the aggressor gNB may detect the complaint signal.

The victim gNB allows the aggressor gNB to mitigate or cancel remote CLI by repeatedly broadcasting the complaint signal until interference decreases below the threshold. The aggressor gNB may repeatedly receive the complaint signal to use the complaint signal to determine whether the victim gNB is being continuously subjected to remote CLI.

[One-Way OTA-Based Approach-2)]
1. Step 1: The victim gNB identifies that remote CLI has occurred.
2. Step 2: The victim gNB broadcasts a predetermined signal to complain to aggressor gNBs about occurrence of remote CLI.
3. Step 3: The aggressor gNB detects the complaint signal transmitted by the victim gNB to acquire information about the victim gNB (e.g., a cell ID, remote interference power, etc.).
4. Step 4: The aggressor gNB transmits the information received from the victim gNB (e.g., a cell ID, a cluster/group ID, remote interference power, etc.) to the victim gNB through a backhaul signal.
5. Step 5: The victim gNB transmits a candidate of a technique that may mitigate remote CLI to the aggressor gNB through the backhaul signal, based on the information received from the aggressor gNB (e.g., the cell ID, the cluster ID, the remote interference power, etc.) and previously known information (e.g., a distance, the number of gNBs in a cluster, etc.).
6. Step 6: The aggressor gNB resolves interference in a corresponding symbol based on information about the candidate of the technique received from the victim gNB.
7. Step 7: The victim gNB continues to perform Step 1 to Step 6 until interference falls below the threshold.

As another aspect of the present disclosure, in the method of reducing remote CLI, the victim gNB may recognize that remote CLI has occurred by aggressor gNB that is distant therefrom. As described above, since the victim gNB is incapable of specifying the aggressor gNB using only the recognized remote CLI, the victim gNB may generate a signal indicating that remote CLI has occurred and then broadcast the generated signal. The broadcast signal may be referred to as the complaint signal. The aggressor gNB may receive the complaint signal and determine whether a signal transmitted thereby causes interference with respect to the victim gNB based on the complaint signal. Then, the aggressor gNB may not transmit signals that cause interference with respect to the victim gNB or reduce power, thereby mitigating or canceling interference. Since the aggressor gNB receives the complaint signal on a predetermined broadcast channel, the aggressor gNB may detect the complaint signal.

The aggressor gNB may acquire information about the victim gNB based on the complaint signal. The information about the victim gNB may include information about a cell ID related to the victim gNB and information about remote interference power. In addition, the complaint signal may include the information about the cell ID related to the victim gNB, information about a cluster ID, information about a group ID, and information about the remote interference power. In addition, the aggressor gNB may obtain the information about the victim gNB from a core network (CN) or may directly obtain the information about the victim gNB through an X2 layer signal from the victim gNB.

The aggressor gNB may transmit the information (backhaul signal) about the victim gNB to the victim gNB through backhaul signaling, and the victim gNB may transmit interference mitigation criteria that may mitigate remote CLI to the aggressor gNB through backhaul signaling, based on the information about the victim gNB. The aggressor gNB may select an appropriate interference mitigation criterion from among the interference mitigation criteria and take an appropriate action for symbols generating remote CLI, based on the selected interference mitigation criterion, so as to mitigate interference generated in the victim gNB. The aggressor gNB may mitigate or cancel interference generated in the victim gNB by reducing the power of the symbols generating remote CLI or not performing transmission in the symbols generating remote CLI.

The victim gNB may repeatedly perform the above procedures until interference at the victim gNB decreases below the threshold, so that the aggressor gNB may mitigate or cancel remote CLI.

The victim gNB may repeatedly perform the above procedures until interference at the victim gNB decreases below the threshold, so that the aggressor gNB may mitigate or cancel remote CLI.

Figure 19:
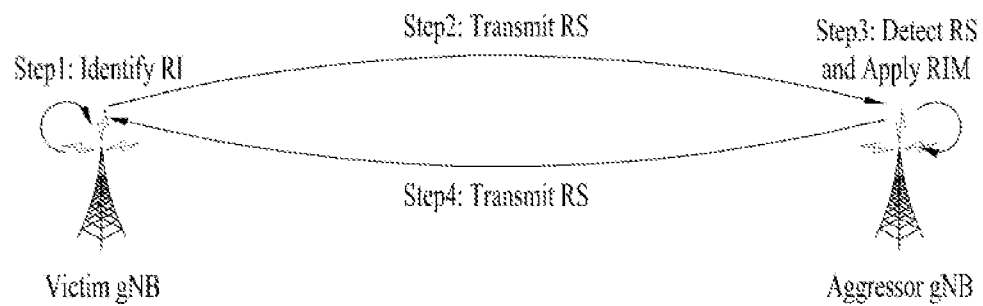
FIGS. 19, 20, and 21 are diagrams for explaining a two-way OTA-based approach according to various examples of the present disclosure.
Figure 20:
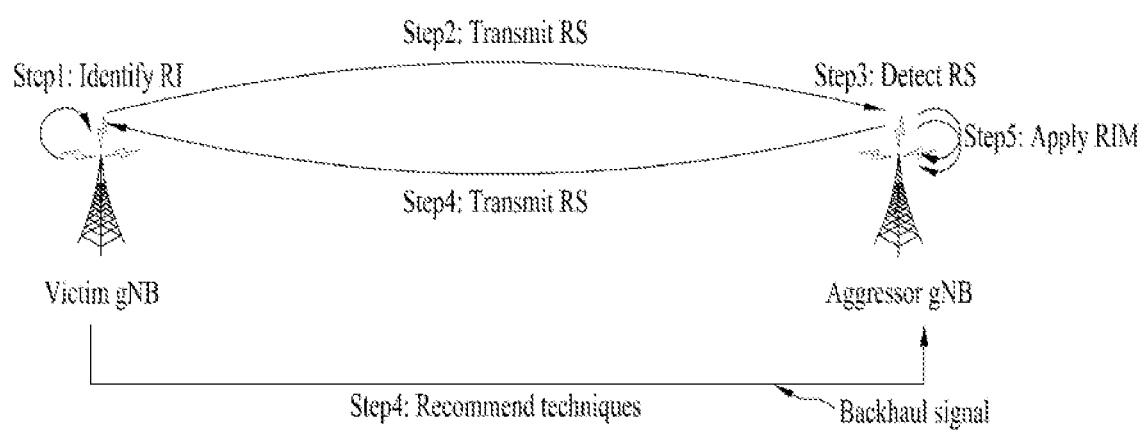
Figure 21:
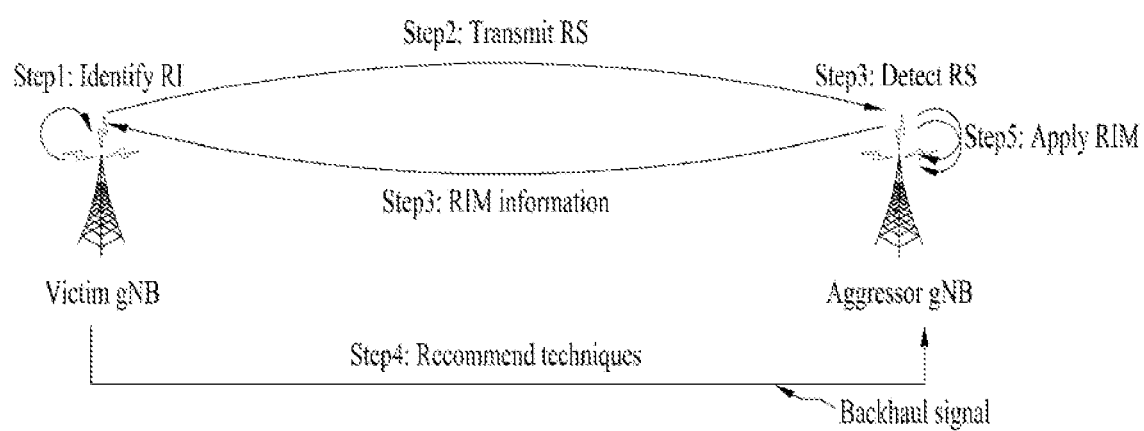

FIGS. 19, 20, and 21 are diagrams for explaining a two-way OTA-based approach according to various examples of the present disclosure.

[Two-Way OTA-Based Approach-1]
1. Step 1: The victim gNB identifies that remote CLI has occurred.

2. Step 2: The victim gNB broadcasts a predetermined signal to complain to aggressor gNBs about occurrence of remote CLI.
3. Step 3: The aggressor gNB detects the complaint signal transmitted by the victim gNB and then resolves interference in a corresponding symbol.
4. Step 4: The aggressor gNB broadcasts a predetermined signal to inform the victim gNB that the aggressor gNB has taken an action to resolve remote CLI.
5. The victim gNB continues to perform Step 1 to Step 4 until interference falls below the threshold.

Unlike the "One-way OTA-based approach-2", the "Two-way OTA-based approach-1" makes it difficult for the aggressor gNB and the victim gNB to specify each other. Therefore, the method of the "Two-way OTA-based approach-1" may be used using the CN even when it is difficult to obtain information about a counterpart gNB. A main difference is that after the aggressor gNB detects the complaint signal, the aggressor gNB broadcasts a signal indicating that an action has been taken to resolve interference, so that the victim gNB may be aware that the aggressor gNB has taken an action to mitigate or cancel interference.

As another aspect of the present disclosure, in the method of reducing remote CLI, the victim gNB may recognize that remote CLI has occurred by the aggressor gNB that is distant therefrom. As described above, since the victim gNB is incapable of specifying the aggressor gNB using only the recognized remote CLI, the victim gNB may generate a signal indicating that the remote CLI has occurred and then broadcast the generated signal. The broadcast signal may be referred to as the complaint signal. The aggressor gNB may receive the complaint signal and determine whether a signal transmitted thereby causes interference with respect to the victim gNB based on the complaint signal. Then, the aggressor gNB may not transmit signals that cause interference with respect to the victim gNB or reduce power, thereby mitigating or canceling interference. Since the aggressor gNB receives the complaint signal on a predetermined broadcast channel, the aggressor gNB may detect the complaint signal.

As described above, the aggressor gNB broadcasts the signal indicating that an action to resolve interference has been taken, and the victim gNB receives the signal indicating that the action has been taken and confirms whether interference has been mitigated or canceled by the aggressor gNB.

The victim gNB repeatedly performs the above procedures until interference at the victim gNB decreases below the threshold, so that the aggressor gNB may mitigate or cancel remote CLI.

[Two-Way OT-Based Approach-2]
1. Step 1: The victim gNB identifies that remote CLI has occurred.
2. Step 2: The victim gNB broadcasts a predetermined signal to complain to aggressor gNBs about occurrence of remote CLI.
3. Step 3: The aggressor gNB detects the complaint signal transmitted by the victim gNB and then broadcasts a predetermined RS to inform the victim gNB of information for resolving remote CLI (e.g., a cell ID of the aggressor gNB, a cluster/group ID to which the aggressor gNB belongs, remote interference power, etc.).
4. Step 4: The victim gNB may detect the RS transmitted by the aggressor gNB to obtain information needed to resolve remote CLI. The victim gNB may transmit a candidate of a technique that may mitigate remote CLI to the aggressor gNB through a backhaul/OTA signal, based on the information received from the aggressor gNB (e.g., the cell ID, the cluster ID, the remote interference power, etc.) and previously known information (e.g., a distance, the number of gNBs in a cluster, etc.).
5. Step 5: The aggressor gNB resolves interference in a corresponding symbol based on information about the candidate of the technique received from the victim gNB.
6. The victim gNB continues to perform Step 1 to Step 5 until interference falls below the threshold.

As another aspect of the present disclosure, in the method of reducing remote CLI, the victim gNB may recognize that remote CLI has occurred by the aggressor gNB that is distant therefrom. As described above, since the victim gNB is incapable of specifying the aggressor gNB using only the recognized remote CLI, the victim gNB may generate a signal indicating that the remote CLI has occurred and then broadcast the generated signal. The broadcast signal may be referred to as the complaint signal. The aggressor gNB may receive (or detect) the complaint signal, transmit a predetermined reference signal, and inform the victim gNB of information for processing remote CLI. The information for processing remote CLI may include a cell ID of the aggressor gNB, a cluster ID to which the aggressor gNB belongs, a group ID to which the aggressor gNB belongs, and remote interference power information.

The victim gNB may detect the reference signal received from the aggressor gNB and obtain the information for processing remote CLI. The victim gNB may generate interference mitigation criteria that may mitigate remote CLI based on the information for processing remote CLI and information previously known to the victim aggressor gNB and transmit a signal including the interference mitigation criteria to the aggressor gNB through a backhaul or OTA signal. The information previously known to the victim gNB may include a distance between the aggressor gNB and the victim gNB and/or the number of gNBs included in a cluster in which the victim gNB is included. The aggressor gNB may select an appropriate interference mitigation criterion from among the interference mitigation criteria and take an appropriate action for symbols experiencing remote CLI, based on the selected interference mitigation criterion, so as to mitigate interference generated in the victim gNB. The aggressor gNB may mitigate or cancel interference generated in the victim gNB by reducing the power of the symbols experiencing remote CLI or skipping transmission in the corresponding symbols.

The victim gNB may repeatedly perform the above procedures until interference at the victim gNB decreases below the threshold, so that the aggressor gNB may mitigate or cancel remote CLI.

[Two-Way OTA-Based Approach-3]
1. Step 1: The victim gNB identifies that remote CLI has occurred.
2. Step 2: The victim gNB broadcasts a predetermined signal to complain to aggressor gNBs about occurrence of remote CLI.
3. Step 3: The aggressor gNB detects the complaint signal transmitted by the victim gNB and then transmits information for resolving remote CLI (e.g., a cell ID, a cluster/group ID, remoter interference power, etc.) to the victim gNB through a backhaul signal.
4. Step 4: The victim gNB transmits a candidate of a technique that may mitigate remote CLI to the aggressor gNB through a backhaul/OTA signal, based on the information received from the aggressor gNB (e.g., the cell ID, the cluster ID, the remote interference power, etc.) and previously known information (e.g., a distance, the number of gNBs in a cluster, etc.).

5. Step 5: The aggressor gNB resolves interference in a corresponding symbol based on information about the candidate of the technique received from the victim gNB.

6. The victim gNB continues to perform Step 1 to Step 5 until interference falls below the threshold.

As another aspect of the present disclosure, in the method of reducing remote CLI, the victim gNB may recognize that remote CLI has occurred by the aggressor gNB that is distant therefrom. As described above, since the victim gNB is incapable of specifying the aggressor gNB using only the recognized remote CLI, the victim gNB may generate a signal indicating that the remote CLI has occurred and then broadcast the generated signal. The broadcast signal may be referred to as the complaint signal. The aggressor gNB may receive (or detect) the complaint signal and transmit information for processing remote CLI through the backhaul or OTA signal. The information for processing remote CLI may include a cell ID of the aggressor gNB, a cluster ID to which the aggressor ID belongs, a group ID to which the aggressor gNB belongs, and remote interference power information.

The victim gNB may detect the reference signal received from the aggressor gNB and obtain the information for processing remote CLI. The victim gNB may generate interference mitigation criteria that may mitigate remote CLI based on the information for processing remote CLI and information previously known to the victim gNB and transmit a signal including the interference mitigation criteria to the aggressor gNB through the backhaul or OTA signal. The information previously known to the victim gNB may include a distance between the aggressor gNB and the victim gNB and/or the number of gNBs included in a cluster in which the victim gNB is included. The aggressor gNB may select an appropriate interference mitigation criterion from among the interference mitigation criteria and take an appropriate action for symbols experiencing remote CLI, based on the selected interference mitigation criterion, so as to mitigate interference generated in the victim gNB. The aggressor gNB may mitigate or cancel interference generated in the victim gNB by reducing the power of the symbols experiencing remote CLI or skipping transmission in the corresponding symbols.

The victim gNB may repeatedly perform the above procedures until interference at the victim gNB decreases below the threshold, so that the aggressor gNB may mitigate or cancel remote CLI.

Hereinafter, in order to perform the above-described procedures, methods performed in individual steps will be described in detail.

[Method of Estimating or Detecting Remote CLI from Aggressor gNB by Victim gNB]

Referring to FIG. 16B, when remote CLI occurs, only symbols of a specific number of a received UL signal are affected by remote CLI, so that a remote CLI signal is included in the UL signal. For example, the UL signal may be transmitted in units of subframes or slots and symbols included in the front part of a UL subframe or a UL slot (i.e., some symbols of the UL subframe or UL slot) in the time domain are subjected to remote CLI. Therefore, for more precise mitigation or cancellation of remote CLI, interference measurement and estimation at the symbol level are required. Remote CLI may be predicted depending on interference measurement and estimation. That is, a certain number of symbols in the front part of the UL subframe or the UL slot will be more affected by interference. Therefore, the interference level of a certain number of symbols in the front part of the UL subframe or the UL slot may be treated as a case above a predetermined interference level threshold, and the interference level of the remaining symbols may be treated as a case below the predetermined interference level threshold. The predetermined interference level threshold may be determined based on the power of symbols in which a demodulation reference signal (DMRS) is included among physical uplink shared channel (PUSCH) signals received from a UE by the victim gNB.

For example, for measurement of remote CLI, the UE may transmit an additional DMRS to the victim gNB in the first UL slot or the first UL symbol after a GP (see victim TRP in FIG. 16 (? FIG. 16A)). The additional DMRS may be generated according to a predetermined pattern. The predetermined pattern may be determined based on a time-frequency location, a sequence type, and a periodicity. In order for the UE to transmit the additional DMRS, the victim gNB may inform the UE of information about the additional DMRS through a PDCCH and a PDSCH.

In addition, for measurement of remote CLI, the UE may transmit the additional DMRS to the victim gNB in the first slot or in the first symbol after the GP. The additional DMRS may be generated according to a predetermined pattern. In order for the UE to transmit the additional DMRS, the victim gNB may trigger transmission of the additional DMRS to the UE through downlink control information (DCI).

[Method of Configuring RS Transmitted to Complain to Aggressor gNB about Occurrence of Remote CLI by Victim gNB]

As described above, in order to recognize whether remote CLI has occurred and inform the aggressor gNB that remote CLI has occurred, the victim gNB may transmit a predefined RS. The predefined RS may be referred to as the complaint signal. As described above, a remote interference channel may maintain reciprocity. Therefore, the aggressor gNB may receive the RS transmitted by the victim gNB. The aggressor gNB may estimate the effect of remote CLI on the victim gNB based on the RS received from the victim gNB.

(Non-Inclusion of ID of Victim gNB)

The RS broadcast by the victim gNB may not include the ID of the victim gNB. For example, in the aforementioned one-way OTA-based approach-1 or two-way OTA-based approach-1, the RS transmitted by the victim gNB may not include the ID of the victim gNB.

(Frequency Domain Indication)

The frequency location of the RS may correspond to a BWP in which the victim gNB is affected by interference. The frequency location of the RS may be aligned with the BWP in which the victim gNB is subjected to interference. That is, frequency information of the RS transmitted by the victim gNB may indicate the BWP in which the victim gNB is subjected to interference. The frequency of the RS may be expressed as a frequency offset. For example, if the frequency information of the RS transmitted by the victim gNB has 6 frequency offsets, the frequency offsets may correspond to indexes of the BWP in which remote CLI has occurred. The indexes of the BWP may be predetermined.

(Time Domain Indication)

The frequency location of the RS may correspond to a specific symbol in which the victim gNB is affected by interference. That is, the frequency location of the RS may be aligned with a specific symbol in which the victim gNB is subjected to interference. That is, the frequency location of the RS transmitted by the victim gNB may indicate the location of the symbol in which the victim gNB is subjected to interference. Frequency location information of the RS may include frequency offset information. As an example, if the frequency location information of the RS includes 12 frequency offsets, information about last symbols (the locations of symbols, the number of symbols, etc.) in which remote CLI has occurred may be obtained based on the frequency offsets.

(Inclusion of Cell ID/Cluster ID of Victim gNB)

The RS (first RS) transmitted by the victim gNB may include information related to the victim gNB. For example, the information related to the victim gNB may include at least one of a cell ID, a cluster ID, or a group ID of the victim gNB. The first RS transmitted by the victim gNB in the above one-way OTA-based approach-2 or two-way OTA-based approach-3 may include the information related to the victim gNB. For example, in order to transmit the cell ID of the victim gNB, a plurality of cell IDs (e.g., 1008 or 504 cell IDs) may be identified by reusing a sequence used in a primary synchronization signal (PSS)/secondary synchronization signal (SSS). The first RS may be generated using the PSS/SSS sequence and then transmitted. As another example, when a representative gNB is present in one cluster including the victim gNB, the first RS may be generated so that information about the ID of the representative gNB may be obtained based on the first RS. The representative gNB may be referred to as a cluster head, and one cluster may include one or more cluster heads. The one or more cluster heads may correspond to one or more gNBs. Information related to the cluster head may be obtained based on the first RS by mapping information about the representative gNB or the cluster head to a corresponding sequence. For example, which cluster among all clusters is affected may be determined based on a sequence used in SSS, and the cluster head of a gNB among three cluster heads in the cluster may be identified based on a sequence used in the PSS. The influence of remote CLI on the victim gNB may be estimated based on the RS transmitted by the victim gNB. As an example, the aggressor gNB may estimate the effect of remote CLI on the victim gNB by distinguishing a gNB that is close in distance from a gNB that is far in distance among three cluster heads included in one cluster, thereby controlling remote CLI.

(Frequency Domain Indication)

The frequency location of the first RS may correspond to a BWP in which the victim gNB is affected by interference. The frequency location of the first RS may be aligned with the BWP in which the victim gNB is subjected to interference. That is, frequency information of the RS transmitted by the victim gNB may indicate the BWP in which the victim gNB is subjected to interference. The frequency information of the first RS may include frequency offset information. For example, if the frequency information of the first RS transmitted by the victim gNB has 6 frequency offsets, the frequency offsets may correspond to indexes of the BWP in which remote CLI has occurred. The indexes of the BWP may be predetermined.

(Time Domain Indication)

The time location of the first RS may correspond to a specific symbol in which the victim gNB is affected by interference. The time location of the RS may be aligned with a specific symbol in which the victim gNB is subjected to interference. That is, the location of a symbol of the RS transmitted by the victim gNB (e.g., a symbol index and/or a symbol offset) may indicate the location of the symbol in which the victim gNB is subjected to interference.

As another embodiment, the frequency location of the first RS may correspond to a specific symbol in which the victim gNB is affected by interference. That is, the frequency location of the RS may be aligned with a specific symbol in which the victim gNB is subjected to interference. That is, the frequency location of the RS transmitted by the victim gNB may indicate the location of the symbol in which the victim gNB is subjected to interference. Frequency location information of the RS may be represented as a frequency offset. As an example, if the frequency location information of the RS includes 12 frequency offsets, information about the last symbol (the location of the symbol, the number of symbols, etc.) in which remote CLI has occurred may be obtained based on the frequency offset.

[Method of Configuring RS Transmitted to Make Request to Victim gNB for Measurement of Remote CLI by Aggressor gNB]

As described above, the victim gNB may predict information about remote CLI generated by the aggressor gNB with respect thereto, based on an RS (second RS) transmitted by the aggressor gNB. The victim gNB may distinguish the aggressor gNB that generates interference, based on the second RS transmitted by the aggressor gNB. The victim gNB may analyze remote CLI based on the second RS. As described above, a remote interference channel may maintain reciprocity. The victim gNB may directly or indirectly estimate remote CLI that the aggressor gNB generates with respect to the victim gNB, based on the second RS transmitted by the aggressor gNB to the victim gNB, by the reciprocal remote interference channel.

(Non-Inclusion of ID of Aggressor gNB)

As described above, the second RS that the aggressor gNB transmits to the victim gNB may not include the ID of the aggressor gNB. In the aforementioned one-way OTA-based approach-1 or two-way OTA-based approach-2, the RS transmitted by the aggressor gNB may not include the ID of the aggressor gNB.

Upon receiving remote CLI information from the victim gNB, the aggressor gNB may make a request to the victim gNB for measurement of remote CLI by transmitting the predetermined second RS, and the victim gNB may be directly or indirectly aware of how much remote CLI the victim gNB receives from the aggressor gNB. As an example, when all aggressor gNBs transmit RSs in performing the two-way OTA-based approach-1, all of the aggressor gNBs may indicate a request for measurement of remote interference to the victim gNB by transmitting aggregated remote interference to the victim gNB using the same RS. The victim gNB may acquire information about aggregated remote interference. As another example, when all of the aggressor gNBs transmit RSs in performing the two-way OTA-based approach-1, all or part of aggressor gNBs may indicate a request for measurement of remote interference to the victim gNB using orthogonal RSs. The victim gNB may estimate how much remote interference the victim gNB receives from the aggressor gNB based on the orthogonal RSs. As another example, when all of the aggressor gNBs transmit RSs in performing the two-way OTA-based approach-1, aggressor gNBs belonging to a predetermined group/cluster may use the same RS, and aggressors gNBs belonging to different groups/clusters may use orthogonal RSs. The victim gNB may estimate how much remote interference the victim gNB receives from aggressor gNBs belonging to any group/cluster.

(Inclusion of Cell/Group/Cluster ID of Aggressor gNB)

As described above, the second RS that the aggressor gNB transmits to the victim gNB may include the cell ID, the group ID, and/or the cluster ID of the aggressor gNB. The second RS transmitted by the aggressor gNB in the above-mentioned two-way OTA-based approach-1 or two-way OTA-based approach-2 may include the cell ID, the group ID, and/or the cluster ID of the aggressor gNB.

Upon receiving remote CLI information from the victim gNB, the aggressor gNB may acquire the second RS by coupling the cell ID, the group ID, and/or the cluster ID thereof to a pregiven RS. The aggressor gNB may inform the victim gNB of how much remote CLI affects the victim gNB by the aggressor gNB by transmitting the second RS. For example, the victim gNB may be aware of the number of gNBs included in a corresponding group or a corresponding cluster based on the group ID and/or the cluster ID. The victim gNB may estimate the amount of interference of the corresponding group or the corresponding cluster by measuring remote interference measured from a representative aggressor gNB of the corresponding group or the corresponding cluster. That is, the amount of interference may be predicted from a plurality of aggressor gNBs having the group ID or the cluster ID. As an example, if the number of gNBs having the group ID or the cluster ID is 100, the amount of aggregated remote interference may be predicted from a plurality of aggressor gNBs having the corresponding group/cluster ID by multiplying 100 by a remote interference level value measured from one representative aggressor gNB.

[Backhaul Information]

If the victim gNB is aware of the ID of the aggressor gNB in the one-way OTA-based approach-2, two-way OTA-based approach-2, and two-way OTA-based approach-3 described above, specific information may be transmitted through backhaul signaling. The specific information transmitted through backhaul signaling may include the following information.

RS configuration (a time-frequency location, a time offset, a frequency offset, sequence information, and/or the number of RS repetitions)

Cell/group/cluster configuration (a cell ID of the aggressor gNB, a group ID of the aggressor gNB, a cluster ID of the aggressor gNB, a cell ID of the victim gNB, a group ID of the victim gNB, a cluster ID of the victim gNB, a list of gNBs corresponding to a group ID, the number of gNBs corresponding to a group ID, a list of gNBs corresponding to a cluster ID, and/or the number of gNBs corresponding to a cluster ID)

Remote CLI level (a remote CLI level of a specific aggressor gNB, a remote CLI level of a specific victim gNB, a remote CLI level of aggressor gNBs corresponding to a group ID, a remote CLI level of aggressor gNBs corresponding to a cluster ID, a remote CLI level of victim gNBs corresponding to a group ID, and/or a remote CLI level of victim gNBs corresponding to a cluster ID)

Interference management technique candidate

Power control information (a power backoff level and/or power boosting level)

Backoff information of a DL transmission symbol or a UL reception symbol (a backoff position (on DL or UL), the number of backoff symbols, and/or a backoff probability)

Beam-specific information (a high-interference transmission (Tx) beam of the aggressor gNB, a high-interference Rx beam of the victim gNB, and/or a down-tilting degree of the aggressor gNB)

Likewise, if the aggressor gNB is aware of the ID of the victim gNB, the aggressor gNB may transmit the specific information to the victim gNB through backhaul signaling.

Figure 22:
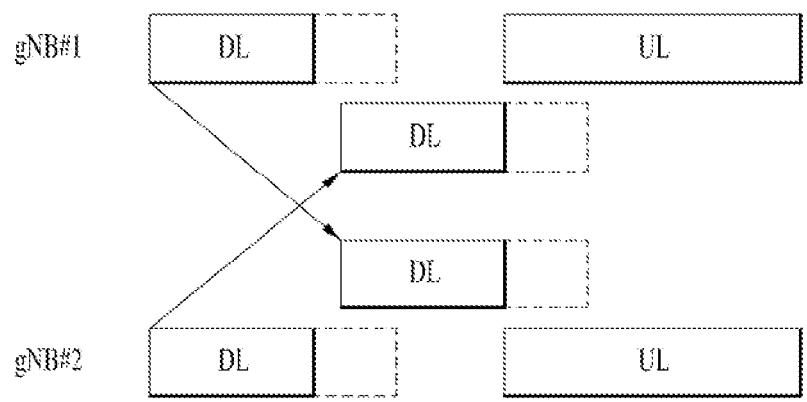
FIG. 22 illustrates a method of reducing remote CLI by controlling DL resources by an aggressor gNB according to the present disclosure.

FIG. 22 illustrates a method of reducing remote CLI by controlling DL resources by an aggressor gNB according to the present disclosure.

[DL Symbol Backoff at Aggressor gNB]

As described above, the aggressor gNB may skip transmission in specific DL symbols based on the information previously received from the victim gNB through the RS or the backhaul signal in order to reduce remote CLI to which the victim gNB is subjected. As an example, the aggressor gNB may not perform transmission in the specific DL symbols based on the RS received from the victim gNB. The aggressor gNB may use a frequency-domain indication and/or a time-domain indication based on the RS. In addition, the aggressor gNB may perform an operation of reducing remote CLI using a cell/cluster ID, a remote CLI level, and an interference management technique candidate, based on a backhaul signal. The aggressor gNB may use the backoff information in order to reduce remote CLI.

[Time Domain]

Referring to FIG. 22, a specific symbol of a DL slot adjacent to a GP may be punctured or muted based on the time-domain indication.

[Frequency Domain]

DL scheduling of a frequency band, a frequency subband, or a BWP experiencing remote CLI may be controlled based on the frequency-domain indication.

[Time-Frequency Domain]

A specific symbol of a DL slot adjacent to a GP of a frequency band, a frequency subband, or a BWP experiencing remote CLI may be punctured or muted, based on information related to time and frequency included in the RS configuration.

[Spatial Domain]

The number of gNBs for DL symbol backoff may be determined based on the number of gNBs corresponding to a group ID or a cluster ID included in the cell/group/cluster configuration. That is, all aggressor gNBs having a specific group ID or cluster ID do not always perform DL backoff Rather, the aggressor gNBs may determine whether to perform DL backoff with a specific probability value. As described above, aggregated remote from aggressor gNBs having the same group/cluster ID CLI may be estimated based on an RS from an aggressor gNB representative of a group/cluster ID. Only some of the aggressor gNBs having the same group/cluster ID may perform backoff. Even if only some of the aggressor gNBs perform backoff, a remote interference level required by the victim gNB may be satisfied. The victim gNB may transmit a probability value to perform backoff to the aggressor gNBs, and each of the aggressor gNBs may perform DL backoff based on the probability value. While minimizing decrease in DL throughput of the aggressor gNBs, remote CLI of the victim gNB may be controlled at an appropriate level. For example, if a probability value pre-calculated by the victim gNB is 0.5, each of the aggressor gNBs having a group/cluster ID may perform DL backoff with a probability of 50%. Alternatively, only 50% of the aggressor gNBs having the same group/cluster ID may perform DL backoff.

Figure 23:
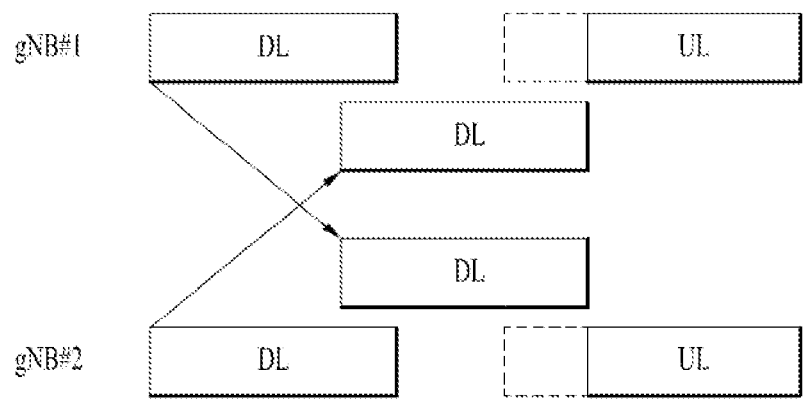
FIG. 23 illustrates a method of reducing remote CLI by controlling UL resources by a victim gNB according to the present disclosure.

FIG. 23 illustrates a method of reducing remote CLI by controlling UL resources by a victim gNB according to the present disclosure.

[UL Symbol Backoff at Victim gNB]

In the method of reducing remote CLI according to the present disclosure, the victim gNB may previously receive configuration information from the aggressor gNB through the RS or backhaul signal. Based on the configuration information, the victim gNB may process a UL symbol of a specific location in order to avoid remote CLI from the aggressor gNB. The configuration information may include a frequency-domain indication and a time-domain indication. In addition, the configuration information may include a cell/cluster ID, a remote CLI level, and an interference management technique candidate. The configuration information may be referred to as backoff information.

[Time Domain]

Referring to FIG. 23, remote CLI may be avoided by not using UL resources that temporally overlap with a DL signal of the aggressor gNB in time, based on information corresponding to the time domain among the configuration information. For example, UL symbols of a UL slot of the victim gNB overlapping the location of DL symbols corresponding to remote CLI of the aggressor gNB may be punctured or specific symbols may be muted.

[Frequency Domain]

DL scheduling of a frequency band or a BWP experiencing remote CLI may be limited using information corresponding to the frequency domain among the configuration information.

[Time-Frequency Domain]

A specific symbol of a DL slot adjacent to a GP of a frequency band or a BWP experiencing remote CLI may be punctured or muted, using information corresponding to time and frequency among the configuration information.

FIG. 24 illustrates a method of reducing remote CLI using down-tilting of an aggressor gNB according to the present disclosure.

[Down Tilting at Aggressor gNB]

Referring to FIG. 24, in the method of reducing remote CLI according to the present disclosure, the aggressor gNB may previously receive configuration information from the victim gNB through the RS or the backhaul signal. Based on the configuration information, the aggressor gNB may down-tilt beamforming of a DL signal in order to reduce the remote CLI to which the victim gNB is subjected.

The configuration information may include the time-domain indication. The configuration information may include the cell/cluster ID, the remote CLI level, and the interference management technique candidate information. Since the configuration information is transmitted through the RS or the backhaul signal, the RS or the backhaul signal may include at least one of the time-domain indication, the cell/cluster ID, the remote CLI level, or the interference management technique candidate information. The interference management technique candidate information may include at least one of power control information, backoff information, or beam-specific information. The beam-specific information may include at least one of a high-interference Tx beam of the aggressor gNB, a high-interference Rx beam of the victim gNB, or a down-tilting degree of the aggressor gNB.

[Symbol Level Power Control at UE at Victim gNB]

As stated above, the effect of remote interference from the aggressor gNB occurs only in specific preceding symbols of a UL slot of the victim gNB, and this is related to the distance between the aggressor gNB and the victim gNB and the length of a DL slot transmitted by the aggressor gNB (the length of a GP between the DL slot and the UL slot). Therefore, UL power may be minimized through UL power control in units of symbols and a robust design against remote interference may be realized while the effect of interference with a neighboring gNB is minimized. As stated above, it is necessary to boost power of only some symbols of the UL slot (especially preceding few symbols). However, power control of a normal symbol level is not supported. Therefore, a method to support power control of a symbol level is proposed.

3GPP TS 38 series (NR) describes power control for a PUSCH as follows.

If the UE transmits the PUSCH in a carrier f of a serving cell c, using a parameter set configuration (index j) and a PUSCH power control adjustment state (index l), the UE may determine a PUSCH transmit power $P_{PUSCH,f,c}(i,j,q_d,l)$ at a PUSCH transmission periodicity i as follows.

[Equation 3]

$$P_{PUSCH,f,c}(i,j,q_d,l) = \min \begin{cases} P_{CMAX,f,c}(i), \\ P_{O_{PUSCH},f,c}(j) + 10\log_{10}(2^\mu \cdot M_{RB,f,c}^{PUSCH}(i)) + \\ \alpha_{f,c}(j)PL_{f,c}(q_d) + \Delta_{TF,f,c}(i)f_{f,c}(i,l) \end{cases} [dBm]$$

To control the PUSCH transmit power in units of symbols, a modification may be made as follows.

[Equation 4]

$$P_{PUSCH,f,c}(i,j,q_d,l,n) = \min \begin{cases} P_{CMAX,f,c}(i), \\ P_{O_{PUSCH},f,c}(j) + 10\log_{10}(2^\mu \cdot M_{RB,f,c}^{PUSCH}(i)) + \\ \alpha_{f,c}(j)PL_{f,c}(q_d) + \Delta_{TF,f,c}(i)f_{f,c}(i,l) + RIM(j,n) \end{cases} [dBm]$$

where n has a value from 0 to $N_{symb}^{slot}$ as an index corresponding to a symbol. The value of RIM(j,n) represents power boosting for remote interference management (RIM). For example. if it is desired to boost only three preceding symbols by 3 dB. RIM(j,n) is as follows.

$$RIM(j,n) = \begin{cases} 3 \text{ dB}, & \text{where } i = 0 \text{ and } n = 0, 1, 2 \\ 0 & \text{otherwise} \end{cases} \quad [\text{Equation 5}]$$

Hereinafter, a framework for RIM will be described.

To manage remote interference, a new framework is defined. This framework may include identifying remote interference at the victim gNB, starting and stopping RS transmission, triggering and stopping RS monitoring, and triggering and stopping information exchanged between the aggressor gNB and the victim gNB via a backhaul signal and an application of techniques for remote interference mitigation and avoidance. In this contribution, various types of frameworks may be introduced, by an OTA signal alone or by the OTA signal and the backhaul signal. One-way represents that the OTA signal is transmitted from the victim gNB to the aggressor gNB, and two-way represents that the OTA signal is transmitted from the victim gNB to the aggressor gNB and is also transmitted in an opposite direction.

To increase the effect and efficiency of RIM, technologies and enablers for an NR RIM framework are being studied. In terms of the aggressor/victim gNB, interference scenarios and candidate techniques for RIM and enablers for supporting the RIM framework are being discussed.

Hereinafter, a one-way OTA-based framework and a two-way OTA-based framework will be described.

The one-way OTA-based framework may be performed by the following procedures.
1. Step 1: The victim gNB identifies remote interference.
2. Step 2: The victim gNB broadcasts a predefined RS to all aggressor gNBs to identify occurrence of remote interference.
3. Step 3: The aggressor gNB detects the RS broadcast by the victim gNB and applies a RIM scheme to resolve remote interference among candidate techniques for RIM.
4. Step 4: Step 1 to Step 3 are repeated until a predetermined condition is satisfied.

The two-way OTA-based framework according to an aspect of the present disclosure may be performed by the following procedures.
1. Step 1: The victim gNB identifies remote interference.
2. Step 2: The victim gNB broadcasts a predefined RS to all aggressor gNBs to identify occurrence of remote interference.
3. Step 3: The aggressor gNB detects the RS broadcast by the victim gNB and applies a RIM scheme to resolve remote interference among candidate techniques for RIM.
4. Step 4: The aggressor gNB broadcasts a predefined RS to the victim gNB to make a request for determination as to whether remote interference still exists.
5. Step 5: Step 1 to Step 4 are repeated until a predetermined condition is satisfied.

Referring to FIG. 26, the main difference of the two-way OTA-based framework from the one-way OTA-based framework is in an approach method in which the aggressor gNB makes a request to the victim gNB for determination as to whether remote interference still exists.

The two-way OTA-based framework according to another aspect of the present disclosure may be performed by the following procedures.
1. Step 1: The victim gNB identifies remote interference.
2. Step 2: The victim gNB broadcasts a predefined first RS to all aggressor gNBs to identify occurrence of remote interference.
3. Step 3: The aggressor gNB may detect the first RS broadcast by the victim gNB and feed back corresponding information for RIM via OTA signaling. In order for the victim gNB to identify the aggressor gNB, the aggressor gNB may transmit a second RS. The corresponding information for RIM may include at least one of a cell ID of the aggressor gNB, a group ID of the aggressor gNB, a cluster ID of the aggressor gNB, or a power level of remote interference.
4. Step 4: The victim gNB measures the second RS received from the aggressor gNB. The victim gNB shares recommended candidate techniques with the aggressor gNB via backhaul signaling based on the information received from the aggressor gNB and preknown information (advance information). The advance information includes at least one of the distance to the aggressor gNB, the number of aggressor gNBs, or a property of a remote interference channel.
5. Step 5: The aggressor gNB applies a RIM scheme to resolve remote interference among the candidate techniques received from the victim gNB.
6. Step 6: Step 1 to step 5 are repeated until a predefined condition is satisfied.

Referring to FIG. 20, the main difference between the two frameworks is an approach method in which the victim gNB informs the aggressor gNB of information about the recommended candidate techniques through backhaul signaling.

Moreover, this mechanism allows more efficient identification of aggressors as compared with above schemes by causing the victim gNB to measure the RS received from potential aggressors. Especially, this mechanism may be helpful and necessary when a RIM scenario is about an asymmetric interference scenario. If gNBs identify potential aggressors based on the measurement of the RS received from the victim gNB depending on link asymmetry, the number of gNBs in each side, and/or a power difference, inaccurate identification of aggressor gNBs may occur and this may cause performance deterioration of a system.

The two-way OTA-based framework according to another aspect of the present disclosure may be performed by the following procedures.
1. Step 1: The victim gNB identifies remote interference.
2. Step 2: The victim gNB broadcasts a predefined first RS to all aggressor gNBs to identify occurrence of remote interference.
3. Step 3: The aggressor gNB may detect the first RS broadcast by the victim gNB and feed back corresponding information for RIM via backhaul or OTA signaling. The corresponding information for RIM may include at least one of a cell ID of the aggressor gNB, a group ID of the aggressor gNB, a cluster ID of the aggressor gNB, or a power level of remote interference.
4. Step 4: The victim gNB shares recommended candidate techniques with the aggressor gNB based on the information received from the aggressor gNB and preknown information (advance information). The advance information includes at least one of the distance to the aggressor gNB, the number of aggressor gNBs, or a property of a remote interference channel.
5. Step 5: The aggressor gNB applies a RIM scheme to resolve remote interference among the candidate techniques received from the victim gNB.
6. Step 6: Step 1 to step 5 are repeated until a predefined condition is satisfied.

Referring to FIG. 21, the main difference between this framework and the two-way OTA/backhaul-based framework-1 is an approach in which the aggressor gNB informs the victim gNB of the information about recommended candidate techniques via backhaul signaling.

Hereinafter, main issues for RIM according to the present disclosure will be described.

For the subject of this study, a quasi-static TDD configuration may be assumed. This means that DL and UL configured between gNBs do not collide with each other in the whole network. In this situation, due to an atmospheric ducting phenomenon, a DL signal propagated from the aggressor gNB may interfere with UL reception of the victim gNB. When two gNBs (gNB #1 and gNB #2) that are far apart from each other are present, a UL signal at gNB #1 may experience interference due to a propagated DL signal of gNB #2. Since there is channel reciprocity, a UL signal of gNB #2 may also experience interference due to a propagated DL signal of gNB #1. This scenario may be related to a symmetric interference scenario of FIG. 23B.

In the case of a simple symmetric remote interference scenario in which only two gNBs exist, parameters for determining the characteristics of remote interference are as follows.
1) Distance between the aggressor gNB and the victim gNB
2) Number of (interfering or active) aggressor gNBs
3) Transmit power of a DL signal of the aggressor gNB
4) The time/distance scale of an environment (especially related to an atmospheric ducting phenomenon)

In a practical environment, the power of remote interference may vary due to the above parameters. Remote interference may be asymmetrically generated depending on the victim gNB. In order to design RIM schemes, the characteristics of remote interference should be considered in an asymmetric interference scenario. Therefore, before designing a mechanism for managing remote interference, the characteristics of remote interference, such as appropriate modeling, statistical properties, a time/distance scale, and a typical distance range, should be studied.

Proposal 1: Study on Characteristics of Remote Interference in Asymmetric Remote Interference Scenario Two types of potential techniques for NR RIM Depending on the victim/aggressor gNBs, RIM techniques may be classified into two types.

Perspective of aggressor gNB

From the perspective of the aggressor gNB, candidate techniques may be introduced. As described above, remote interference relates to overlapping symbols between the propagated DL signal and the UL signal.

To resolve remote CLI, DL signal backoff, Tx down-tilting, and power control may be considered.

DL Symbol Backoff in Time Domain

Referring to FIG. 22, a DL symbol backoff technique may be considered as a simple solution for mitigating and managing remote CLI. A UL signal of the victim gNB may avoid an interference situation by muting interference symbols of a DL slot of the aggressor gNB.

However, this technique may reduce DL throughput at the aggressor gNB.

Therefore, use of this technique should be carefully considered. When enabling this technique, there may be standard issues such as how to determine the number of backoff symbols and how to configure this backoff information for UEs.

DL Frequency Allocation

DL Frequency Allocation

In the frequency domain, using different frequency bands for the aggressor gNBs and the victim gNB is also a simple technique for canceling remote CLI. However, since only a part of the frequency bands is used, this technique may be effective when DL data traffic of the aggressor gNB is low. If the victim gNB provides information about a BWP to the aggressor gNB via backhaul or OTA signaling, DL bandwidth may be adjusted and allocated to the victim gNB in consideration of remote CLI.

Tx Down-Tilting in Spatial Domain

Controlling a transmission beam at the aggressor gNB may be considered as a possible solution for RIM. In a remote CLI situation, controlling the transmission beam may be an effective solution because interference is fixed due to predetermined and coordinated locations of gNBs. Usually, beam coordination between the aggressor gNB and the victim gNB is a very effective technique for managing interference. However, it may be very challenging to estimate or use beam-specific information (such as Tx/Tx beamforming information) between distant gNBs. In the present disclosure, a very simple method of beam control (e.g., down-tilting) may be effective in the remote CLI scenario described in FIG. 24.

Referring to FIG. 24, the aggressor gNB may change DL beamforming to remove remote CLI by down-tilting a Tx beam. However, due to the down-tilted Tx beam at the aggressor gNB, cell coverage may be reduced and performance of a cell edge user may be deteriorated. Hence, it is important to consider both remote CLI reduction and performance impact of DL users. Similarly, power reduction in the case of interfering with DL symbols may be considered. For example, similar to an enhanced inter-cell interference coordination (eICIC) technique, gNBs may schedule only cell-centric UEs with low power while interfering with the DL symbols.

When the gNB is a potential aggressor and interferes with DL parts, if it is not desirable to configure quasi-static measurement RS transmission, it is somewhat difficult to reduce measurement power of RSs such as a synchronization signal block (SSB) and a channel state information reference signal (CSI-RS). Alternatively, a quasi-static RS configuration may be canceled by adopting a dynamic slot format indication (SFI). As described above, if the dynamic SFI is considered, a CLI issue may become more complex. In that respect, it is proposed that the network avoid the configuration of a measurement RS in potential interference with DL resources.

Perspective of Victim gNB

In this situation, candidate techniques may be derived from the perspective of the victim gNB. In order to resolve remote CLI, UL symbol backoff and UL power control may be considered.

UL Symbol Backoff in Time Domain

A UL symbol backoff technique at the victim gNB may be considered as a direct solution to avoid remote CLI. Referring to FIG. 23, a UL signal at the victim gNB may avoid an interference situation by muting potentially interfering symbols of a UL slot of the victim gNB.

When aggregated remote CLI is composed of different lengths of DL symbols from various aggressor gNBs, the length of UL symbol backoff may vary in order to reduce UL throughput loss. In the present disclosure, identifying aggregated gNBs at the victim side may help to optimize remote interference reduction and performance impact of UL users.

UL Power Control

UL power control may be considered for robust remote interference. As described above, remote interference relates to overlapping symbols between the propagated DL signal and the UL signal. This means that power control of any interfering symbols is required. In order to minimize power consumption at the UE, UL power control at a symbol level should be carefully considered. Indication of such power control at the symbol level may be considered.

The technique may more effectively operate in different scenarios. For example, if there are not many UL slots in which mitigation at a victim side significantly affects the overall system performance, it may be desirable to perform a mitigation technique of an aggressor side. On the other hand, if the victim side has many UEs and much load, it may not be desirable to force DL performance reduction of the aggressor side. One potential approach is to trigger an interference indication only if the victim does not want to perform the mitigation technique of the victim side. However, since the victim may not determine which is better in a current situation in which the victim is not aware of aggressors and conditions at the aggressors, the above-described method may be inefficient. Another approach is for the victim to identify the aggressors, based on an RS from the aggressor and to determine an interference mitigation technique considering the conditions. The conditions include load and the number of victim/aggressor gNBs. Then, in order to coordinate between aggressor gNBs and victim gNBs, a proposed mitigation technique may be recommended through backhaul signaling. This is more efficient as compared with just one mitigation technique in some of the frameworks described above. The benefit of coordination between the aggressor gNB and the victim gNB may be obtained.

Proposal 2: Further Study on which Techniques are Effective for RIM in Asymmetric Interference Scenario Needs to be Conducted In a RIM scenario, a plurality of interference mitigation techniques may be provided. A mechanism may be provided to identify which technique is appropriate. For example, the victim may recommend an interference mitigation technique based on information about aggressors such as the load and number of gNBs.

Enablers Supporting RIM

When the above potential techniques are used, remote interference may be effectively and efficiently canceled. To support such schemes, enablers should be studied. Hereinafter, considerations of backhaul/OTA signaling for exchanging information for RIM and coordination will be described. In order to support RIM, information exchange between remote gNBs is needed via OTA/backhaul signaling.

OTA Signal Design

The aggressor gNB and the victim gNB may transmit and receive an RS. For example, in order for the victim gNB to identify a remote interference situation and for the aggressor gNB to trigger RIM, the victim gNB may transmit the RS (at least one of a cell ID of the victim gNB, a group ID of the victim gNB, or a cluster ID of the victim gNB) to the aggressor gNB. The aggressor gNB may transmit an RS to the victim gNB in order to estimate the power of remote interference and to identify the cell ID of the aggressor/victim gNB, the group ID of the aggressor/victim gNB, and the cluster ID of the aggressor/victim gNB.

As described above, using existing RSs may be a starting point. To determine the necessity of a dedicated RS, it is necessary to clarify the limitations of the existing RSs by simulation and research, in terms of detection performance and confusion issues.

Proposal 3: Existing RSs May be Starting Points. The Necessity of Dedicated RS Needs to be Further Studied.

Backhaul Signal Design

To support remote interference management, information exchange between the aggressor gNB and the victim gNB is required via backhaul signaling. At least the following information may be useful for adjusting the aggressor/victim gNB for RIM.

RS configuration (e.g., a time-frequency location, a time offset, a frequency offset, sequence information, the number of RS repetitions, etc.)

Cell/group/cluster configuration (a cell ID of the aggressor gNB, a group ID of the aggressor gNB, a cluster ID of the aggressor gNB, a cell ID of the victim gNB, a group ID of the victim gNB, a cluster ID of the victim gNB, a list of gNBs corresponding to the group ID, the number of gNBs corresponding to the group ID, a list of gNBs corresponding to the cluster ID, and/or the number of gNBs corresponding to the cluster ID)

Mapping information between a group/cluster/site/set ID and a gNB ID

Remote interference level (a remote CLI level of a specific aggressor gNB, a remote CLI level of a specific victim gNB, a remote CLI level of aggressor gNBs corresponding to a group ID, a remote CLI level of aggressor gNBs corresponding to a cluster ID, a remote CLI level of victim gNBs corresponding to a group ID, and/or a remote CLI level of victim gNBs corresponding to a cluster ID)

Potential interference management technique candidate

Power control information (a power backoff level, a power boosting level, and/or the number of symbols)

Backoff information related to DL/UL symbols (a DL/UL backoff indication and/or the number of backoff symbols)

Beam-specific information (a high-interference Tx beam of the aggressor gNB, a high-interference Rx beam of the victim gNB, and/or a down-tilting degree of the aggressor gNB)

Proposal 4: For Backhaul Signaling, at Least the Following Information is Considered.

RS configuration

Cell/group/cluster ID of the aggressor/victim gNB

Mapping information between a group/cluster/site/set ID and a gNB ID

Remote interference level

Potential RIM techniques

The aggressor gNB should be capable of detecting the above RS transmitted by the victim gNB in order for the victim gNB to inform the aggressor gNB of occurrence of remote CLI, even in various asynchronous environments, because the distance between the victim gNB and the aggressor gNB differs. In order for the aggressor gNB to detect the RS, the shape of the RS transmitted by the victim gNB may be repeated on the time axis. That is, the RS may be detected even in an asynchronous environment by repeating the same sequence multiple times (two or more times) on the time axis. The sequence may be obtained from the detected RS. Hereinafter, a method of repeatedly transmitting the RS by the victim gNB will be described.

[Repetition of a Sequence May be Acquired Using a Plurality of Symbols.]

Figure 25:
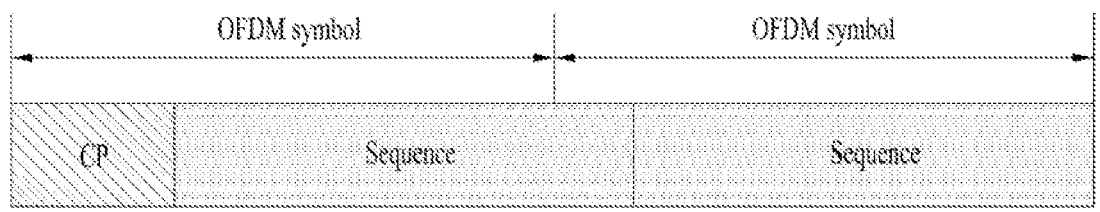
FIG. 25 is a diagram for explaining an RS repeatedly transmitted by a victim gNB according to an aspect of the present disclosure.

FIG. 25 is a diagram for explaining an RS repeatedly transmitted by a victim gNB according to an aspect of the present disclosure.

Referring to FIG. 25, RS symbols may be generated by repeating the same sequence on the time axis using two OFDM symbols. A cyclic prefix (CP) may be located in front of the two symbols, and the length thereof may be twice the length of the CP included in one symbol.

[Time Repetition of a Sequence May be Obtained by Transmitting the Sequence in a Comb-Type in the Frequency Domain within One Symbol.]

Figure 26A:
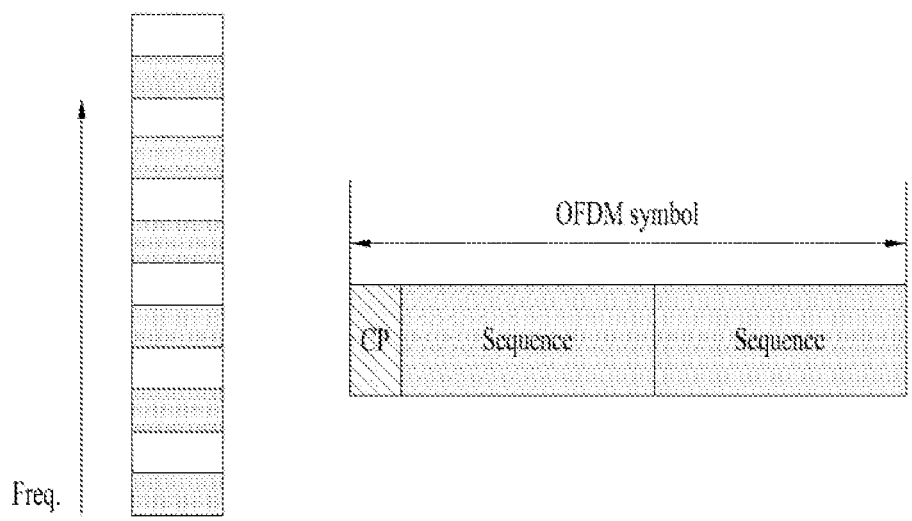
FIGS. 26A and 26B are diagrams for explaining an RS repeatedly transmitted by a victim gNB according to another aspect of the present disclosure.
Figure 26B:
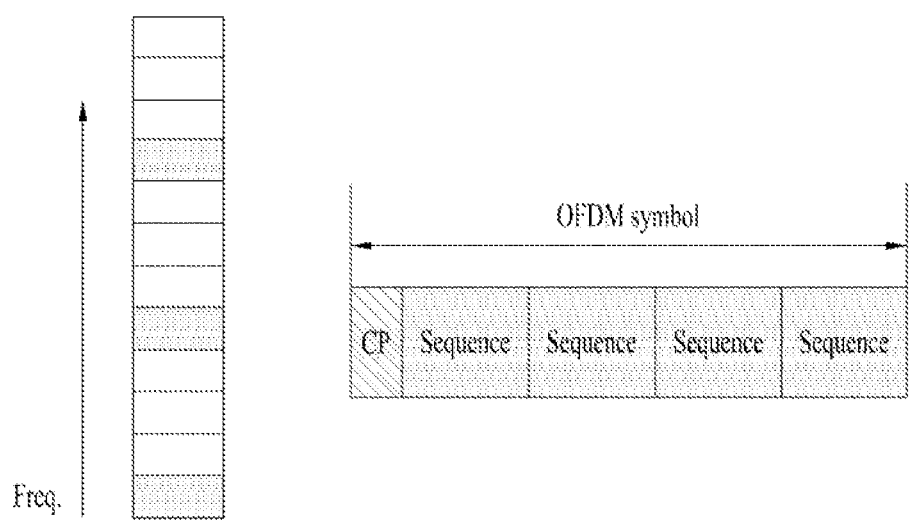

FIGS. 26A and 26B are diagrams for explaining an RS repeatedly transmitted by a victim gNB according to another aspect of the present disclosure.

When a sequence is transmitted in a comb type on the frequency axis, the sequence may be repeated on the time axis within one OFDM symbol. Referring to FIGS. 26A and 26B, the sequence may be repeated on a time axis within one OFDM symbol using Comb-2 and Comb-4.

FIG. 26A illustrates the case in which the sequence is repeated twice within one OFDM symbol using Comb-2, and FIG. 26B illustrates the case in which the sequence is repeated four times within one OFDM symbol using Comb-4.

When BW is fixed, the length of the sequence may differ in the two methods. That is, if an RS is transmitted in a BW of 20 MHz, the length of the sequence in the case of Comb-2 and Comb-4 is reduced to ½ or ¼ as compared with the length of the sequence of the first method. That is, when the gNB detects the RS, since the length of the sequence decreases, detection performance may deteriorate. Hereinafter, a method of improving sequence detection performance will be described.

[Power Combining Performance May be Obtained by Transmitting the Same RS in a Plurality of Continuous or Discontinuous Symbols and Frames.]

00: Transmission of the same RS at the same frequency location of a plurality of continuous symbols
    01: Transmission of the same RS at the same time/frequency location of a plurality of continuous frames
    10: Transmission of the same RS at the same frequency location of a plurality of discontinuous symbols
    11: Transmission of the same RS at the same time/frequency location of a plurality of discontinuous frames That is, it is possible to compensate for the decrease in the length of the sequence occurring in the comb-type by performing power combining through a plurality of continuous or discontinuous time repetitions.

[Time Repetition Information of an RS for RIM May Determine the Number of Repetitions and a Repetition Type Through a Parameter of "Number of RS Repetitions" of an RS Configuration.]

Figure 27:
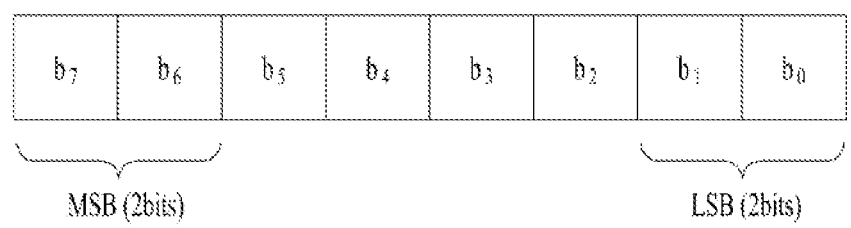
FIG. 27 is a diagram illustrating a bit sequence structure of the number of RS repetitions according to the present disclosure.

FIG. 27 is a diagram illustrating a bit sequence structure of the number of RS repetitions according to the present disclosure.

Referring to FIG. 27, the number of RS repetitions may be 8 bits. Among the 8 bits of the number of RS repetitions, two most significant bits (MSBs) ($b_7$ and $b_6$) may be mapped to numbers of the above four cases. When a higher 1 bit ($b_7$) of the MSBs is 0, the same RS is transmitted at the same frequency location of continuous frames or continuous symbols. In the case of continuous frames, the RS may be transmitted in the next continuous frame, and in the case of continuous symbols, the RS may be transmitted in the previous continuous symbol. When the higher 1 bit ($b_7$) of the MSBs is 1, the same RS may be transmitted using discontinuous symbols or discontinuous frames. In addition, two least significant bits (LSBs) ($b_1$ and $b_0$) may represent the number of repetitions. That is, 00 may represent one-time transmission (no repetition), 01 may represent twice transmissions (one additional repetitive transmission), 10 may represent three-time transmission (two additional repetitive transmissions), and 11 may represent four-time transmission (three additional repeated transmissions). If the number of bits of LSBs increases to M bits, repetitive transmissions of a maximum of $2^M-1$ times may be performed. The remaining bits may represent a pattern of discontinuous symbols or frames.

[In Order to Improve Remote Interference Symbol Detection Granularity, a Plurality of Different RSs Having a Comb-Type Sequence May be Transmitted in Different Symbols of the Same Frame.]

Figure 28:
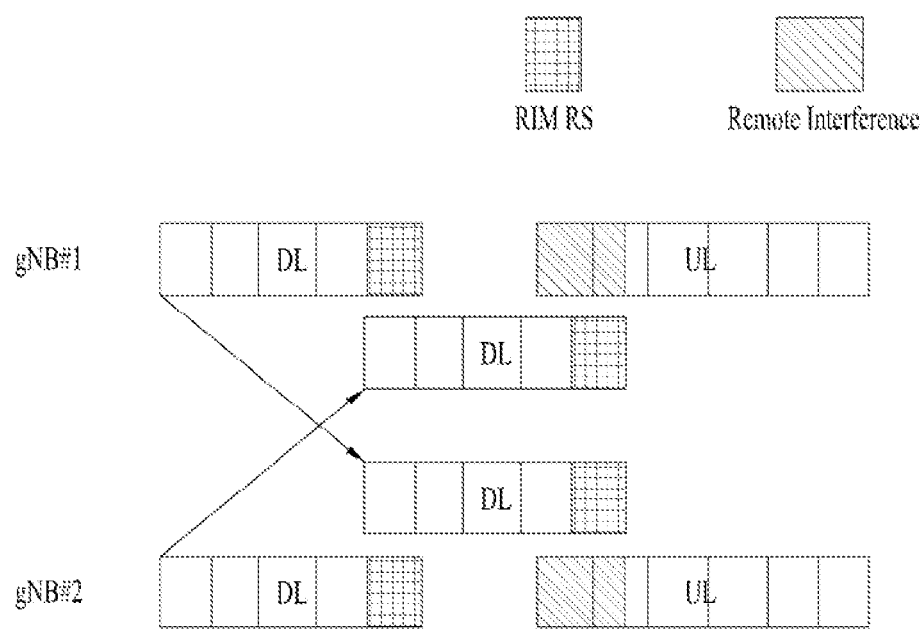
FIG. 28 is a diagram for explaining estimation of a location of a symbol experiencing interference in a method of canceling remote interference according to the present disclosure.

FIG. 28 is a diagram for explaining estimation of a location of a symbol experiencing interference in a method of canceling remote interference according to the present disclosure.

The location of a symbol experiencing remote interference may be estimated through the RS. A remote interference channel may have a reciprocity property. If the aggressor gNB detects the RS transmitted by the victim gNB in detection windows, it may be determined that the aggressor gNB generates remote interference in a corresponding UL symbol of the victim gNB. However, in this situation, there may be ambiguity when estimating the location of a symbol experiencing remote interference. That is, the case in which the aggressor gNB fails to detect the RS in a UL symbol experiencing remote interference (the case in which the RS is partially received) may not be estimated.

Referring to FIG. 28, remote interference of the aggressor gNB may be partially received in the second UL OFDM symbol of the victim gNB, and it may be necessary for the aggressor gNB to estimate this symbol location. To this end, the victim gNB may inform the aggressor gNB of the boundary of an RS during RS transmission, so that the aggressor gNB may predict the degree of partial remote interference based on the type of the received RS.

For example, when transmitting an RS having a sequence of the Comb-2 type, a total of two repetitions may be transmitted in a plurality of discontinuous symbols. Upon receiving the RS, the aggressor gNB receiving the RS may receive different sequences in the same frame and detect the location of a symbol experiencing interference at a half symbol level, based on the different sequences.

Cell/group/cluster/set ID information of the gNB may be obtained based on the RS for RIM. That is, the cell/group/cluster/set ID information of the gNB may be included in the RS for RIM. RS configuration information may include time and frequency locations, a time offset, and a frequency offset, and the cell/group/cluster/set ID information of the gNB may be obtained based on the RS configuration information. That is, the cell/group/cluster ID information may be obtained based on orthogonal time resources and frequency resources in addition to cross correlation of the sequence. Mapping information between a combination of the time resource, the frequency resource, and a sequence resource and the cell/group/cluster/set ID may be preconfigured. It may be assumed that the mapping information is shared in advance by all gNBs.

Figure 29:
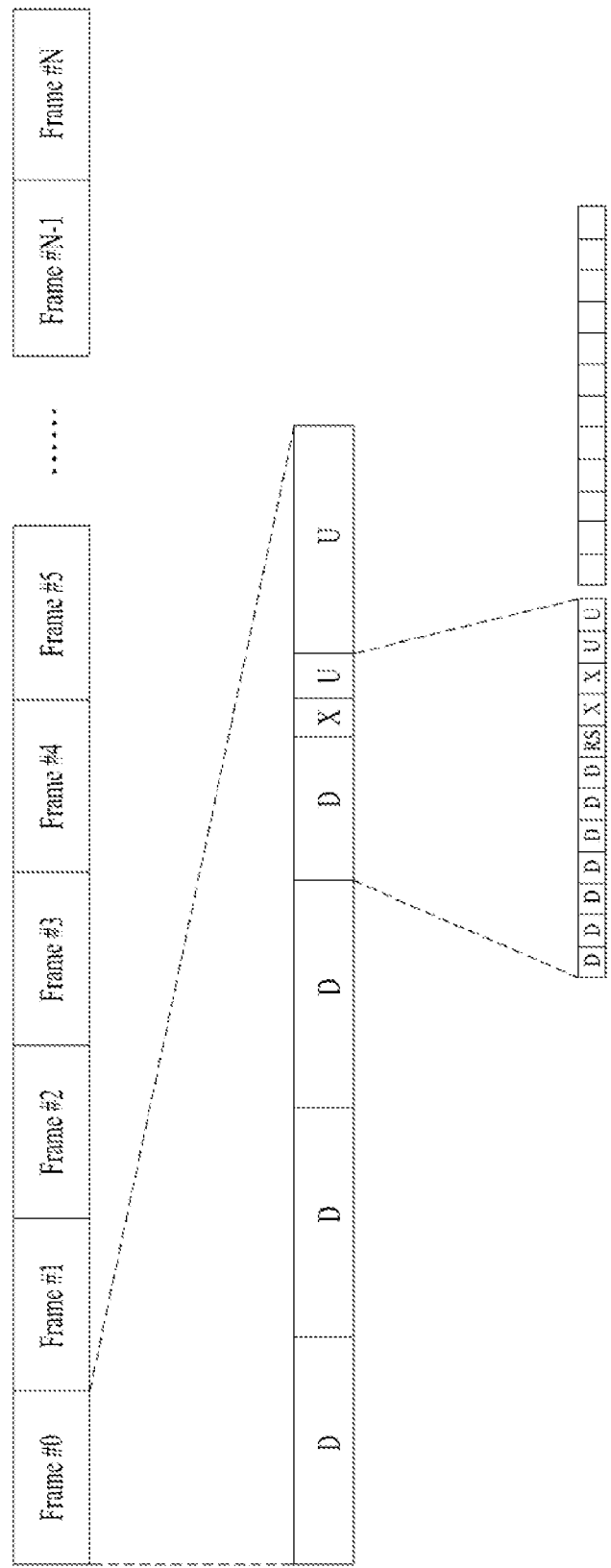
FIG. 29 is a diagram for explaining mapping information between a combination of a preset time resource, a preset frequency resource, and a preset sequence resource and a cell/group/cluster/set ID.

FIG. 29 is a diagram for explaining mapping information between a combination of a preset time resource, a preset frequency resource, and a preset sequence resource and a cell/group/cluster/set ID.

Time
    If the periodicity of an RS for RIM is N frames and the value of two MSBs of the number of RS repetitions is 00 or 10 (symbol repetition), a total of N cell/group/cluster/set IDs may be identified on the time axis.
    If the periodicity of the RS for RIM is N frames and the value of two MSBs of the number of RS repetitions is 01 or 11 (frame repetition), a total of N/2 cell/group/cluster/set IDs may be identified on the time axis when the value of two LSBs is 01 (repetition=2), a total of N/3 cell/group/cluster/set IDs may be identified on the time axis when the value of two LSBs is 10 (repetition=3), and a total of N/4 cell/group/cluster/set IDs may be identified on the time axis when the value of two LSBs is 11 (repetition=3).

Code
    Cell/group/cluster/set IDs may be identified according to the number of sequences used in the RS for RIM. For example, if 8 sequences are used, a total of 8 cell/group/cluster/set IDs may be identified.

Frequency
    As many cell/group/cluster IDs as the difference between the BW of the RS for RIM and the BW of a system may be identified. For example, if the BW of the RS for RIM is 5 MHz and the BW of the system is 20 MHz, a total of 4 cell/group/cluster/set IDs may be identified.
    Cell/group/cluster/set IDs may be identified by a combination of time/code/frequency specified above.

Design of RS for RIM

Reuse of Existing RS in NR

As discussed in objectives of NR-RIM SID, existing RSs for identifying strong remote CLI may be considered as the beginning of the discussion. For example, the existing RSs may include a CSI-RS, a DMRS, and a physical random access channel (PRACH). As a starting point, an RS having the form of a plurality of repetitions in the time domain may be considered in order to avoid symbol-level sliding of a detection window in an asymmetric environment from the perspective of a receiver. NR supports a quiet and flexible configuration of an RS. For example, a CSI-RS with high mobility has a density of 3 REs per physical resource block (PRB). As described above, this means that such a pattern has 4 repetitions in the time domain within one OFDM symbol due to comb-like mapping in the frequency domain. A PRACH type A1 or B1 and a double-symbol DMRS have a form of two repetitions in the time domain within two OFDM symbols.

Proposal 1: Existing RS Patterns (e.g., a CSI-RS and a PRACH) are Considered to Design an RS for RIM.

Time-Frequency Location of RS for RIM

Time Location of RS for RIM

Figure 30A:
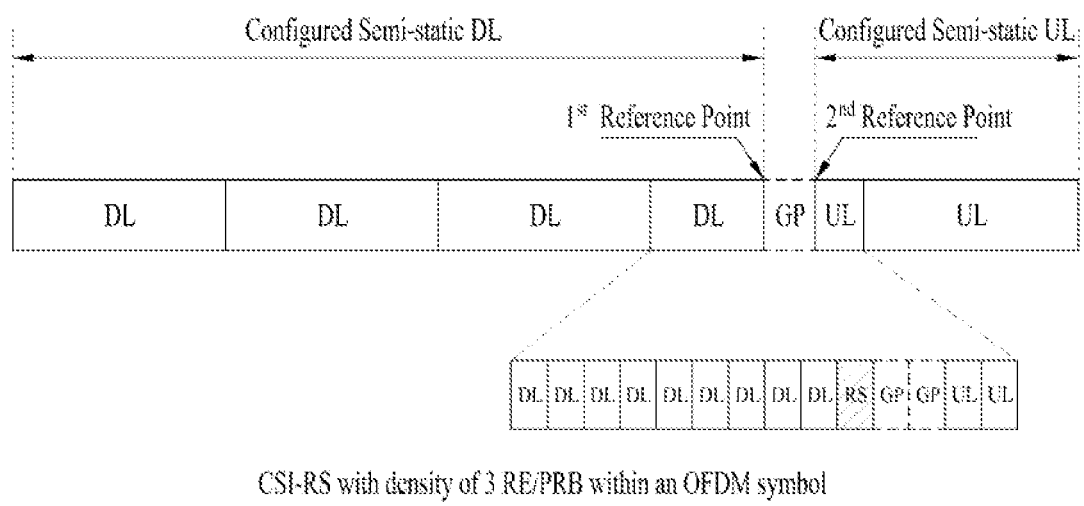
FIGS. 30A and 30B are diagrams for explaining the time location of an RS for remote interference management (RIM) in a method of reducing remote CLI according to the present disclosure.
Figure 30B:
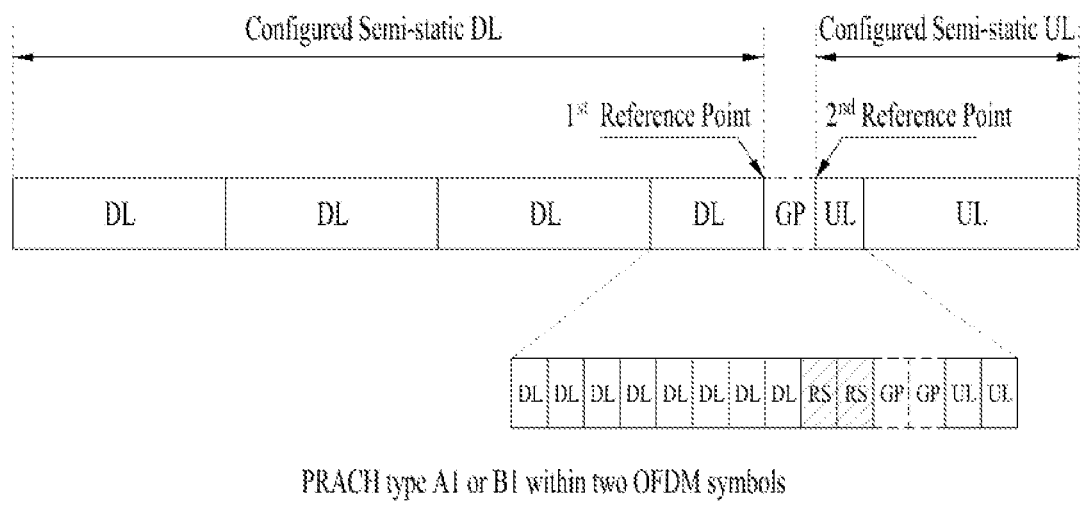

FIGS. 30A and 30B are diagrams for explaining the time location of an RS for RIM in a method of reducing remote CLI according to the present disclosure.

Referring to FIGS. 30A and 30B, in order to avoid ambiguity of an existing RS and an RS for RIM at a receiving gNB side, the time location of the RS for RIM may be the last one symbol (FIG. 30A) or the last two symbols (FIG. 30B) before a first reference point. A fixed RS location may be used to accurately estimate the propagation delay between an aggressor gNB and a victim gNB.

Proposal 2: RS for RIM May be Transmitted Only Immediately Before First Reference Point.

Frequency Location of RS for RIM

If the frequency location of an RS for RIM is different from a PUSCH, a gNB should have a high-performance RF chain with a fast (symbol-level) frequency switching function. Therefore, in order to reduce ambiguity and implementation complexity of RS detection for RIM, the frequency location of the RS for RIM should be limited to a pre-aligned frequency range. For example, the RS for RIM should be transmitted in the same frequency range as a DL BWP.

Proposal 3: RS for RIM May be Transmitted at Pre-Aligned Frequency Location (e.g., the Same Frequency Range as DL BWP)

Frequency Location of RS for RIM

As described above, for backhaul signaling between the aggressor gNB and the victim gNB, the RIM framework requires identification of at least one of a cell ID, a group ID, a cluster ID, or a site ID of the victim gNB at the aggressor gNB. Therefore, the RS for RIM should include information such as at least one of a cell ID, a group ID, a cluster ID, or a site ID of a transmitting gNB. In order to identify transmitting gNBs with different sequence allocation, the cross-correlation performance of the sequence of the RS for RIM should be evaluated. If the number of gNBs is less than or equal to the number of different sequences in the RS for RIM, it may be sufficient to allocate different sequences to different gNBs. However, when the peak number of transmitting gNBs is larger than the number of different sequences, this may increase a false alarm probability. Furthermore, detection complexity and detection performance of gNBs may be considered in the above-described situation. That is, in order to attempt to detect the RS for RIM within detection windows, how many different sequences are expected at a receiving side should be considered.

In order to disperse RSs and derive additional ID-related information, the time-frequency locations of RS resources may be used by allocating different frequency locations using a subband-wise location, a frequency offset, or a comb offset (FDM), allocating different time locations using a slot/frame offset (TDM) within RS periodic windows, or allocating different sequences considering a cross-correlation property (CDM).

Proposal 4: Time-Frequency Domain Resource Allocation of RS for RIM should be Considered.

Repetition of RS for RIM Enhancement

Repetition of RS for RIM Enhancement

In an asymmetric remote interference scenario, the probability of detecting a sequence at the aggressor gNB may be lowered due to low signal strength of an RS from victim gNBs by the lack of RS accumulation (a small number of victim gNBs) and by a low signal-to-noise ratio (SNR) caused by low reference signal received power (RSRP). In this case, repetition in the time domain or in the frequency domain may be considered to enhance detection performance. If the same RSs are transmitted in the same symbol and in the same frequency location in a cascaded frame by the victim gNB, better detection performance may be achieved at the aggressor gNB because the aggressor gNB may combine all repeated RSs from the victim gNB. Moreover, the RSs may be multiplexed in the frequency domain. In such cases, the victim gNB may transmit the same RSs in an adjacent frequency band in the same symbol, and the aggressor gNB may achieve better detection performance due to the combined RSs from the victim gNB.

Proposal 5: Repetition in Time Domain or Frequency Domain May be Considered to Enhance Detection Performance.

Figure 31:
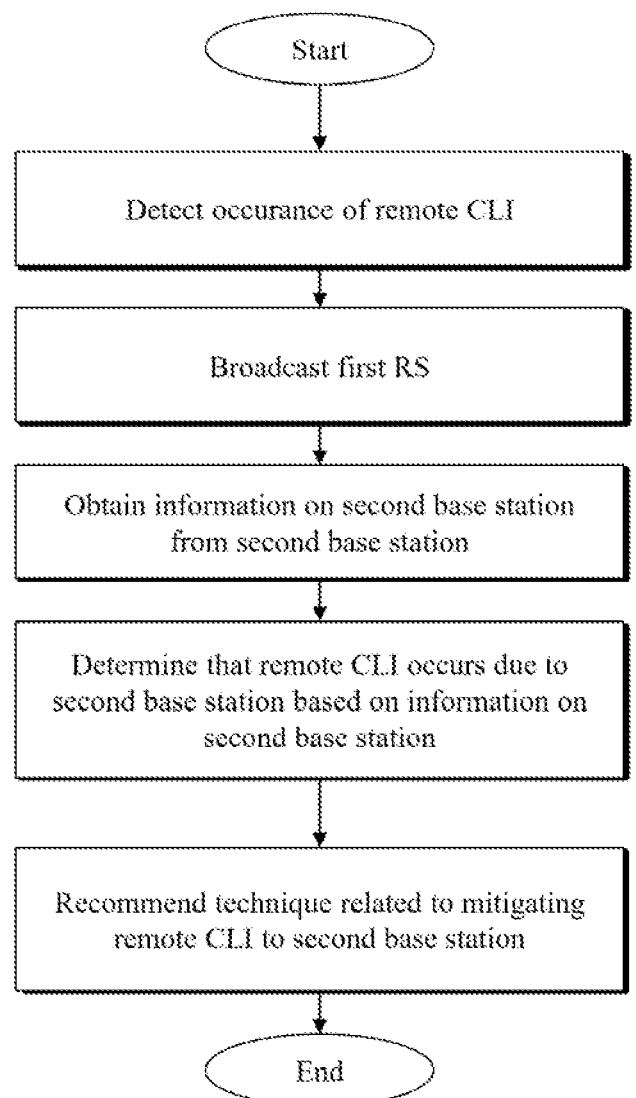
FIG. 31 is a diagram for explaining specific procedures of a method of reducing remote CLI according to the present disclosure.

FIG. 31 is a diagram for explaining specific procedures of a method of reducing remote CLI according to the present disclosure.

Referring to FIG. 31, a method of cancelling remote CLI between BSs by a first BS according to the present disclosure includes detecting occurrence of the remote CLI; broadcasting a first RS including information related to the first BS, based on detection of occurrence of the remote CLI; obtaining information related to a second BS from the second BS; and confirming that the remote CLI has been generated by the second BS, based on the information related to the second BS.

The first BS may be referred to as a victim BS, and the second BS may be referred to as an aggressor BS. Due to characteristics of the remote CLI, a DL signal of the victim BS may interfere with a UL signal of the aggressor BS. In addition, since an atmospheric duct effect occurs in two ways, the victim BS may become the aggressor BS. This may be called a reciprocity relationship. Usually, from which BS the remote CLI has originated may not be recognized. Therefore, the first BS broadcasts the first RS, and the second BS that receives the second RS may determine whether itself is responsible for occurrence of the remote CLI of the first BS, based on the first RS. The second BS may determine whether the remote CLI affecting the first BS is generated thereby, based on a distance between the first BS and the second BS and a timing according to a propagation delay effect of the remote CLI.

If the remote CLI affecting the first BS is caused by the second BS, the second BS may broadcast a second RS or directly notify the first BS that the remote CLI is caused by the second RS via backhaul signaling.

The information related to the first BS may include at least one of a cell ID of the first BS, a group ID of the first BS, or a cluster ID of the first BS. The remote CLI may be generated by a plurality of BSs. That is, the remote CLI may be generated in the form of combining a plurality of interference signals. Therefore, the group/cluster ID of the first BS as well as the cell ID of the first BS may be useful in processing the remote CLI.

The second BS may calculate a distance between the first BS and the second BS based on the information related to the first BS, obtain a location of a time-frequency resource of a DL signal of the second BS at which the remote CLI affects a UL signal of the first BS, based on the distance between the first BS and the second BS, and skip transmission of the DL signal of the second BS or reduce power of the DL signal, at the obtained location of the time-frequency resource.

The method of cancelling remote CLI according to the present disclosure may further include obtaining information related to the remote CLI; and transmitting information about a technique for cancelling the remote CLI to the second BS, based on the information related to the second BS and the information related to the remote CLI.

The information related to the first BS may at least include a cell ID of the first BS, a group ID of the first BS, or a cluster ID of the first BS, and the information related to the second BS may at least include a cell ID of the second BS, a group ID of the second BS, or a cluster ID of the second BS.

The method of cancelling remote CLI according to the present disclosure may further include receiving a second RS from the second BS, and the information related to the second BS may be acquired based on the second RS.

A location of a time-frequency resource of the first RS and a location of a time-frequency resource of the second RS may be preset, and the second BS may detect occurrence of the remote CLI at the first BS, based on the location of the time-frequency resource of the first RS.

A method of canceling remote CLI by a second BS according to the present disclosure may include receiving a first RS including information related to a first BS; confirming that the remote CLI has occurred at the first BS by DL transmission of the second BS, based on the first RS; and transmitting information related to the second BS to the first BS.

A method of cancelling remote CLI according to the present disclosure may further include calculating a distance between the first BS and the second BS based on the information related to the first BS; obtaining a location of a time-frequency resource of a DL signal of the second BS at which the remote CLI affects a UL signal of the first BS, based on the distance between the first BS and the second BS; receiving information about a technique for canceling the remote CLI from the first BS; and skipping transmission of the DL signal of the second BS or reducing power of the DL signal, at the location of the time-frequency resource.

A first BS for cancelling remote CLI between BSs according to the present disclosure may include a transceiver connected to at least one processor; and the at least one processor.

The at least one processor may be configured to detect occurrence of the remote CLI, broadcast a first RS including information related to the first BS, based on detection of occurrence of the remote CLI, obtain information related to a second BS from the second BS, and confirm that the remote CLI has been generated by the second BS, based on the information related to the second BS.

In the apparatus for cancelling remote CLI according to the present disclosure, the at least one processor may further be configured to obtain information related to the remote CLI, and transmit information about a technique for cancelling the remote CLI to the second BS, based on the information related to the second BS and the information related to the remote CLI.

The information related to the first BS may at least include a cell identifier of the first BS, a group identifier of the first BS, or a cluster identifier of the first BS, and the information related to the second BS may at least include a cell identifier of the second BS, a group identifier of the second BS, or a cluster identifier of the second BS.

In the apparatus for cancelling remote CLI according to the present disclosure, the at least one processor may further be configured to receive a second RS from the second BS, and the information related to the second BS may be acquired based on the second RS.

A location of a time-frequency resource of the first RS and a location of a time-frequency resource of the second RS may be preset, and the second BS may detect occurrence of the remote CLI at the first BS, based on the location of the time-frequency resource of the first RS.

A second BS for cancelling remote CLI between BSs according to the present disclosure may include a transceiver connected to at least one processor, and the at least one processor.

The at least one processor may be configured to receive a first RS including information related to a first BS, confirm that the remote CLI has occurred at the first BS by DL transmission of the second BS, based on the first RS, and transmit information related to the second BS to the first BS.

The at least one processor may further be configured to calculate a distance between the first BS and the second BS based on the information related to the first BS, obtain a location of a time-frequency resource of a DL signal of the second BS at which the remote CLI affects a UL signal of the first BS, based on the distance between the first BS and the second BS, receive information about a technique for canceling the remote CLI from the first BS; and skip transmission of the DL signal of the second BS or reduce power of the DL signal, at the obtained location of the time-frequency resource.

The first BS may be installed in a self-driving device communicating with at least one of a mobile terminal, a BS, or a self-driving vehicle.

The aforementioned proposals and embodiments are achieved by combination of structural elements and features of the present disclosure in a predetermined manner. Each of the structural elements or features should be considered selective unless otherwise mentioned. Each of the structural elements or features may be carried out without being combined with other structural elements or features. Also, some structural elements and/or features may be combined with one another to constitute the embodiments of the present disclosure. Operations orders described in the embodiments of the present disclosure may be rearranged. Some structural elements or features of one embodiment may be included in another embodiment, or may be replaced with corresponding structural elements or features of another embodiment. Moreover, it will be apparent that claims that are not explicitly cited in each other in the appended claims may be presented in combination as an embodiment of the present disclosure or included as a new claim by means of amendment after the application is filed.

Those skilled in the art will appreciate that the present disclosure may be carried out in other specific ways than those set forth herein without departing from the spirit and essential characteristics of the present disclosure. The above exemplary embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The method of reporting measurement information and the UE therefor may be industrially applicable to various wireless communication systems such as a 3GPP LTE/LTE-A system and a 5G communication system.

The invention claimed is:

1. A method of cancelling remote cross-link interference (CLI) between base stations (BSs) by a first BS, the method comprising:
 detecting occurrence of the remote CLI;
 broadcasting a first reference signal (RS) including information related to the first BS, based on detection of occurrence of the remote CLI;
 obtaining information related to a second BS from the second BS by determining whether the remote CLI affecting the second BS is generated thereby, based on a distance between the first BS and the second BS and a timing according to a propagation delay effect of the remote CLI; and
 confirming that the remote CLI has been generated by the second BS, based on the information related to the second BS by broadcasting a second RS or directly notifying the second BS that the remote CLI is caused by the first RS via backhaul signaling.

2. The method of claim 1, further comprising: obtaining information related to the remote CLI; and transmitting information related to a technique for cancelling the remote CLI to the second BS, based on the information related to the second BS and the information related to the remote CLI.

3. The method of claim 2, wherein the information related to the first BS at least includes a cell identifier of the first BS, a group identifier of the first BS, or a cluster identifier of the first BS, and wherein the information related to the second BS at least includes a cell identifier of the second BS, a group identifier of the second BS, or a cluster identifier of the second BS.

4. The method of claim 3, further comprising receiving a second RS from the second BS, wherein the information related to the second BS is acquired based on the second RS.

5. The method of claim 4, wherein a location of a time-frequency resource of the first RS and a location of a time-frequency resource of the second RS are preset, and wherein the second BS detects occurrence of the remote CLI at the first BS, based on the location of the time-frequency resource of the first RS.

6. A method of canceling remote cross-link interference (CLI) between base stations (BSs) by a second BS, the method comprising:
 receiving a first reference signal (RS) including information related to a first BS;
 confirming that the remote CLI has occurred at the first BS by downlink transmission of the second BS, based on the first RS by calculating a distance between the first BS and the second BS based on the information related to the first BS, obtaining a location of a time-frequency resource of a downlink signal of the second BS at which the remote CLI affects an uplink signal of the first BS, based on the distance between the first BS and the second BS, and skipping transmission of the downlink signal of the second BS or reducing power of the downlink signal, at the obtained location of the time-frequency resource based on the technique for canceling the remote CLI; and
 transmitting information related to the second BS to the first BS by broadcasting a second RS or directly notifying the first BS that the remote CLI is caused by the first RS via backhaul signaling.

7. A first base station (BS) for cancelling remote cross-link interference (CLI) between BSs, the first BS comprising:
 a transceiver connected to at least one processor; and
 the at least one processor, wherein the at least one processor is configured to
 detect occurrence of the remote CLI, broadcast a first reference signal (RS) including information related to the first BS, based on detection of occurrence of the remote CLI,
 obtain information related to a second BS from the second BS by determining whether the remote CLI affecting the second BS is generated thereby, based on a distance between the first BS and the second BS and a timing according to a propagation delay effect of the remote CLI, and
 confirm that the remote CLI has been generated by the second BS, based on the information related to the second BS by broadcasting a second RS or directly notifying the second BS that the remote CLI is caused by the first RS via backhaul signaling.

8. The first BS of claim 7, wherein the at least one processor is further configured to obtain information related to the remote CLI, and transmit information related to a technique for cancelling the remote CLI to the second BS, based on the information related to the second BS and the information related to the remote CLI.

9. The first BS of claim 8, wherein the information related to the first BS at least includes a cell identifier of the first BS, a group identifier of the first BS, or a cluster identifier of the first BS, and wherein the information related to the second BS at least includes a cell identifier of the second BS, a group identifier of the second BS, or a cluster identifier of the second BS.

10. The first BS of claim 9, wherein the at least one processor is further configured to receive a second RS from the second BS, and wherein the information related to the second BS is acquired based on the second RS.

11. The first BS of claim 10, wherein a location of a time-frequency resource of the first RS and a location of a time-frequency resource of the second RS are preset, and wherein the second BS detects occurrence of the remote CLI at the first BS, based on the location of the time-frequency resource of the first RS.

12. A second base station (BS) for cancelling remote cross-link interference (CLI) between BSs, the second BS comprising:
 a transceiver connected to at least one processor; and
 the at least one processor, wherein the at least one processor is configured to
 receive a first reference signal (RS) including information related to a first BS about a technique for canceling the remote CLI from the first BS,
 confirm that the remote CLI has occurred at the first BS by downlink transmission of the second BS, based on the first RS by
  calculating a distance between the first BS and the second BS based on the information related to the first BS,
  obtaining a location of a time-frequency resource of a downlink signal of the second BS at which the remote CLI affects an uplink signal of the first BS, based on the distance between the first BS and the second BS, and skipping transmission of the downlink signal of the second BS or reduce power of the downlink signal, at the obtained location of the time-frequency resource based on the technique for canceling the remote CLI, and transmit information related to the second BS to the first BS by broadcasting a second RS or directly notifying the first BS that the remote CLI is caused by the first RS via backhaul signaling.

13. The first BS of claim 7, wherein the first BS is installed in a self-driving device communicating with at least one of a mobile terminal, a base station, or a self-driving vehicle.

\* \* \* \* \*